(12) United States Patent
Carroll et al.

(10) Patent No.: US 10,437,897 B2
(45) Date of Patent: Oct. 8, 2019

(54) METHODS AND SYSTEMS FOR RECOMMENDING PACKAGES OF DOMAIN NAMES FOR REGISTRATION

(71) Applicant: Go Daddy Operating Company, LLC, Scottsdale, AZ (US)

(72) Inventors: James Carroll, Kirkland, WA (US); Takao Suzuki, Redmond, WA (US)

(73) Assignee: Go Daddy Operating Company, LLC, Scottsdale, AZ (US)

( * ) Notice: Subject to any disclaimer, the term of this patent is extended or adjusted under 35 U.S.C. 154(b) by 996 days.

(21) Appl. No.: 14/500,711

(22) Filed: Sep. 29, 2014

(65) Prior Publication Data

US 2015/0058330 A1    Feb. 26, 2015

Related U.S. Application Data

(63) Continuation-in-part of application No. 13/965,627, filed on Aug. 13, 2013, which is a continuation-in-part of application No. 13/956,878, filed on Aug. 1, 2013.

(51) Int. Cl.
   *G06F 15/16*      (2006.01)
   *G06F 16/9535*    (2019.01)
   *H04L 29/12*      (2006.01)
   *G06Q 10/10*      (2012.01)

(52) U.S. Cl.
   CPC ......... *G06F 16/9535* (2019.01); *G06Q 10/10* (2013.01); *H04L 61/3025* (2013.01)

(58) Field of Classification Search
   CPC .............. G06F 17/30867; G06Q 10/00; H04L 61/3025

USPC ........................................................ 709/203
See application file for complete search history.

(56) References Cited

U.S. PATENT DOCUMENTS

| | | |
|---|---|---|
| 6,314,469 B1 | 11/2001 | Tan et al. |
| 7,921,035 B2 | 4/2011 | Adelman |
| 8,489,746 B2 | 7/2013 | Nicks et al. |
| 2004/0044791 A1 | 3/2004 | Pouzzner |
| 2004/0167982 A1* | 8/2004 | Cohen ............... G06F 17/30876 709/226 |
| 2008/0162692 A1 | 7/2008 | Schultz et al. |
| 2009/0248625 A1 | 10/2009 | Adelman et al. |
| 2009/0248734 A1 | 10/2009 | Adelman et al. |
| 2009/0248735 A1 | 10/2009 | Adelman et al. |
| 2009/0248736 A1 | 10/2009 | Adelman et al. |

(Continued)

OTHER PUBLICATIONS

Latitude /Longitude Finder, MapQuest Developer Network, as seen on Jan. 25, 2011 on Archive.org, Source: https :/ /web.arch ive.org/ web/20 11 0 125132733/http ://developer. mapquest.com/web/ tools/.

*Primary Examiner* — Normin Abedin
(74) *Attorney, Agent, or Firm* — Greenberg Traurig, LLP

(57) ABSTRACT

A system and method are presented for recommending packages of domain names. One or more computer servers receive a query including at least one keyword from a user. A business category associated with the user is identified and a first ranking of top level domain names for the business category is identified. A package of candidate domain names is generated containing a candidate domain name for each top level domain in the first ranking of top level domain names. The package of candidate domain names relevant to the query is displayed for selection and registration by the user.

5 Claims, 15 Drawing Sheets

(56) References Cited

U.S. PATENT DOCUMENTS

| | | |
|---|---|---|
| 2009/0287671 A1 | 11/2009 | Bennett |
| 2010/0223113 A1 | 9/2010 | Lee |
| 2010/0223132 A1 | 9/2010 | Lee |
| 2010/0223144 A1 | 9/2010 | Lee |
| 2010/0286977 A1 | 11/2010 | Chin et al. |
| 2011/0208731 A1* | 8/2011 | Nicks ................ G06F 17/30887 707/728 |
| 2011/0208767 A1 | 8/2011 | Nicks |
| 2011/0258237 A1 | 10/2011 | Thomas |
| 2012/0096019 A1* | 4/2012 | Manickam ........ H04L 29/12632 707/767 |
| 2012/0271877 A1 | 10/2012 | Nicks et al. |
| 2012/0271878 A1 | 10/2012 | Nicks et al. |
| 2012/0272172 A1 | 10/2012 | Nicks et al. |
| 2014/0082064 A1 | 3/2014 | Nicks et al. |
| 2014/0201126 A1 | 7/2014 | Zadeh et al. |

* cited by examiner

METHODS AND SYSTEMS FOR RECOMMENDING PACKAGES OF DOMAIN NAMES FOR REGISTRATION

CROSS-REFERENCE TO RELATED APPLICATIONS

This application is a continuation-in-part of and claims priority to U.S. patent application Ser. No. 13/965,627 filed Aug. 13, 2013 and entitled "METHODS AND SYSTEMS FOR RECOMMENDING TOP LEVEL AND SECOND LEVEL DOMAINS" which is a continuation-in-part of and claims priority to U.S. patent application Ser. No. 13/956,878 filed Aug. 1, 2013 and entitled "METHODS AND SYSTEMS FOR RECOMMENDING TOP LEVEL DOMAINS."

FIELD OF THE INVENTION

The present inventions generally relate to domain name registration and, more particularly, systems and methods for recommending top level, second level, nth level and/or sub domains based on a number of factors relevant to a user and/or a business associated with the user.

SUMMARY OF THE INVENTION

An example embodiment of a method includes receiving, by one or more computer servers via a communications network, a query including at least one keyword and a desired language. The query is submitted by a user via a client device. The method includes executing, by the one or more computer services, a language detection program against the query to identify a first language having a highest probability of a number of candidate language of being a language in which the query is written, identifying, by the one or more computer servers, one or more keywords in the query, and translating, by the one or more computer servers, the one or more keywords from the first language identified by the language detection program into the desired language to generate one or more translated keywords. The method includes generating, by the one or more computer servers, a listing of candidate domain names relevant to the one or more translated keywords, and enabling, by the one or more computer servers, the user to select one or more of the candidate domain names for registration.

An embodiment of a method includes receiving, by one or more computer servers via a communications network, a query including at least one keyword, the query being submitted by a user via a client device, identifying, by the one or more computer servers, a business category associated with the user, and a accessing, by the one or more computer servers, a data base storing a plurality of top level domain name rankings to identify a first ranking of top level domain names for the business category. The method includes generating, by the one or more computer servers, a listing of candidate domain names relevant to the query, and displaying, by the one or more computer servers, the listing of candidate domain names relevant to the query for selection and registration by the user. The listing of candidate domain names is ordered according to the first ranking of top level domain names for the business category.

An embodiment of a system includes one or more computer servers communicatively coupled to a communications network and configured to perform the steps of receiving via the communications network a query including at least one keyword and a desired language, the query being submitted by a user via a client device, executing a language detection program against the query to identify a first language having a highest probability of a number of candidate language of being a language in which the query is written, identifying one or more keywords in the query, translating the one or more keywords from the first language identified by the language detection program into the desired language to generate one or more translated keywords, generating a listing of candidate domain names relevant to the one or more translated keywords, and enabling the user to select one or more of the candidate domain names for registration.

An embodiment of a method includes receiving, by one or more computer servers via a communications network, a query including at least one keyword. The query is submitted by a user via a client device. The method includes identifying, by the one or more computer servers, a business category associated with the user, accessing, by the one or more computer servers, a data base storing a plurality of top level domain name rankings to identify a first ranking of top level domain names for the business category, and generating, by the one or more computer servers, a package of candidate domain names relevant to the query. The package of candidate domain names including a candidate domain name for each top level domain name in the first ranking of top level domain names. The method includes displaying, by the one or more computer servers, the package of candidate domain names relevant to the query for selection and registration by the user.

An embodiment of a method includes receiving, by one or more computer servers via a communications network, a query including at least one keyword. The query is submitted by a user via a client device. The method includes identifying, by the one or more computer servers, a business category associated with the user, identifying, by the one or more computer servers, a first ranking of top level domain names for the business category, and generating, by the one or more computer servers, a package of candidate domain names containing a candidate domain name for each top level domain in the first ranking of top level domain names. The method includes displaying, by the one or more computer servers, the package of candidate domain names relevant to the query for selection and registration by the user.

An embodiment of a system includes one or more computer servers communicatively coupled to a communications network and configured to perform the steps of receiving, by one or more computer servers via a communications network, a query including at least one keyword, the query being submitted by a user via a client device, identifying, by the one or more computer servers, a business category associated with the user, accessing, by the one or more computer servers, a data base storing a plurality of top level domain name rankings to identify a first ranking of top level domain names for the business category, generating, by the one or more computer servers, a package of candidate domain names relevant to the query, the package of candidate domain names including a candidate domain name for each top level domain name in the first ranking of top level domain names, and displaying, by the one or more computer servers, the package of candidate domain names relevant to the query for selection and registration by the user.

DETAILED DESCRIPTION

Figure 1:
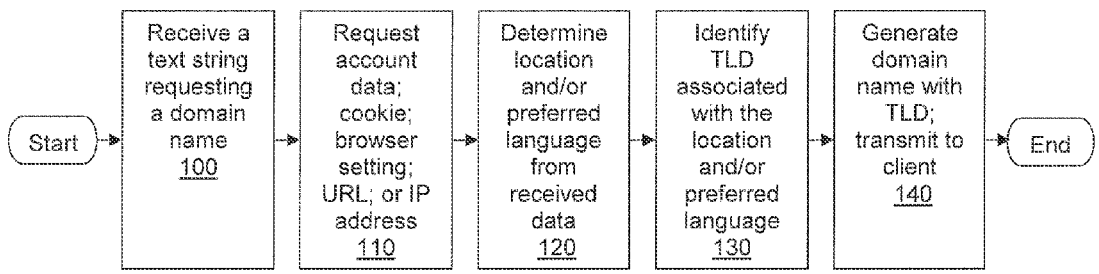
FIG. 1 is a flow diagram illustrating a possible embodiment of a method for recommending top level, second level, nth level and/or sub domains.

The present inventions will now be discussed in detail with regard to the attached drawing figures, which were briefly described above. In the following description, numerous specific details are set forth illustrating the Applicant's best mode for practicing the inventions and enabling one of ordinary skill in the art to make and use the inventions. It will be obvious, however, to one skilled in the art that the present inventions may be practiced without many of these specific details. In other instances, well-known machines, structures, and method steps have not been described in particular detail in order to avoid unnecessarily obscuring the present inventions. Unless otherwise indicated, like parts and method steps are referred to with like reference numerals.

A network is a collection of links and nodes (e.g., multiple computers and/or other devices connected together) arranged so that information may be passed from one part of the network to another over multiple links and through various nodes. Examples of networks include the Internet, the public switched telephone network, the global Telex network, computer networks (e.g., an intranet, an extranet, a local-area network, or a wide-area network), wired networks, and wireless networks.

The Internet is a worldwide network of computers and computer networks arranged to allow the easy and robust exchange of information between people or organizations that make use of network or computer resources (users). Hundreds of millions of people around the world have access to computers connected to the Internet via Internet Service Providers (ISPs). Content providers (e.g., website owners or operators) place multimedia information (e.g., text, graphics, audio, video, animation, and other forms of data) at specific locations on the Internet referred to as websites. Websites comprise a collection of connected or otherwise related, web pages. The combination of all the websites and their corresponding web pages on the Internet is generally known as the World Wide Web (WWW) or simply the Web.

Some Internet users, typically those that are larger and more sophisticated, may provide their own hardware, software, and connections to the Internet. But many Internet users either do not have the resources available or do not want to create and maintain the infrastructure necessary to host their own websites. To assist such individuals (or entities), hosting companies exist that offer website hosting services. These hosting providers typically provide the hardware, software, and electronic communication means necessary to connect multiple websites to the Internet. A single hosting provider may literally host thousands of websites on one or more hosting servers.

Browsers are able to locate specific websites because each website, resource, and computer on the Internet has a unique Internet Protocol (IP) address. Presently, there are two standards for IP addresses. The older IP address standard, often called IP Version 4 (IPv4), is a 32-bit binary number, which is typically shown in dotted decimal notation, where four 8-bit bytes are separated by a dot from each other (e.g., 64.202.167.32). The notation is used to improve human readability. The newer IP address standard, often called IP Version 6 (IPv6) or Next Generation Internet Protocol (IPng), is a 128-bit binary number. The standard human readable notation for IPv6 addresses presents the address as eight 16-bit hexadecimal words, each separated by a colon (e.g., 2EDC:BA98:0332:0000:CF8A:000C:2154:7313).

IP addresses, however, even in human readable notation, are difficult for people to remember and use. A Uniform Resource Locator (URL) is much easier to remember and may be used to point to any computer, directory, or file on the Internet. A browser is able to access a website on the Internet through the use of a URL. The URL may include a Hypertext Transfer Protocol (HTTP) request combined with the website's Internet address, also known as the website's domain name. An example of a URL with a HTTP request and domain name is: http://www.companyname.com. In this example, the "http" identifies the URL as a HTTP request and the "companyname.com" is the domain name.

Domain names are much easier to remember and use than their corresponding IP addresses. The Internet Corporation for Assigned Names and Numbers (ICANN) approves some Generic Top-Level Domains (gTLD) and delegates the responsibility to a particular organization (a "registry") for maintaining an authoritative source for the registered domain names within a TLD and their corresponding IP addresses. For certain TLDs (e.g., .biz, .info, .name, and .org) the registry is also the authoritative source for contact information related to the domain name and is referred to as a "thick" registry. For other TLDs (e.g., .com and .net) only the domain name, registrar identification, and name server information is stored within the registry, and a registrar is the authoritative source for the contact information related to the domain name. Such registries are referred to as "thin" registries. Most gTLDs are organized through a central domain name Shared Registration System (SRS) based on their TLD.

The process for registering a domain name with .com, .net, .org, and some other TLDs (including recently-introduced customized gTLDs) allows an Internet user to use an ICANN-accredited registrar to register their domain name. For example, if an Internet user, John Doe, wishes to register the domain name "mycompany.com," John Doe may initially determine whether the desired domain name is available by contacting a domain name registrar. The Internet user may make this contact using the registrar's webpage and typing the desired domain name into a field on the registrar's webpage created for this purpose. Upon receiving the request from the Internet user, the registrar may ascertain whether "mycompany.com" has already been registered by checking the SRS database associated with the TLD of the domain name. The results of the search then may be displayed on the webpage to thereby notify the Internet user of the availability of the domain name. If the domain name is available, the Internet user may proceed with the registration process. If the domain name is not available for registration, the Internet user may keep selecting alternative domain names until an available domain name is found.

Applicant has determined, however, that presently-existing methods and systems only suggest available domain names based upon synonyms of the desired domain name, and do not provide customized TLDs, second level domains (SLD), nth level domains and/or sub domains for the domain name based upon a location and/or a preferred language of the user. Thus, if a user cannot find a desired domain name specific to the user's language and/or current location, the user may have to sacrifice the desired domain name with a TLD, SLD, nth level domains and/or sub domains specific to the language or location for a completely different domain name based on nothing more than synonyms of the desired domain name or a TLD specified by the user.

Applicant has therefore determined that optimal systems and methods may improve on presently-existing domain name suggestion algorithms by determining the location and/or preferred language of the user and suggesting the desired domain name(s), including a TLD, SLD, nth level domain and/or sub domain customized to the location and/or preferred language. Optimally, these systems and methods may determine the location and/or preferred language of the user based upon: a user account for the user; a browser cookie stored on the client computer; a browser setting for a browser running on the client computer; a URL entered into the browser; and/or an IP address of the client computer. Such systems and methods may overcome a lack of TLD, SLD, nth level domain and/or sub domain customization introduced by presently-existing methods and systems.

Several different methods may be used to provide and manage the disclosed inventions. In an example embodiment illustrated in FIG. 1, any combination of software modules running on one or more server computers, as described herein, may receive, from one or more client computers communicatively coupled to the network, a request for one or more domain names, the request possibly comprising a text string for requesting the domain name (Step 100), and may request and receive a data comprising: i) a user account for a user operating the client; ii) a browser cookie stored on the client, possibly comprising data generated and stored during a previous session; iii) at least one browser setting for a browser running on the client; iv) a URL entered into the browser; and/or v) an IP address of the client on the network (Step 110).

The method illustrated in FIG. 1 may further comprise the steps of: the server determining, from the data, i) a location of the client; and/or ii) a preferred language for a user operating the client (Step 120); identifying, within a database communicatively coupled to the network, a TLD associated with the location and/or with the preferred language, and/or generating an SLD, nth level domain and/or sub domain associated with the location and/or with the preferred language; (Step 130) and generating and transmitting to the client, for display in the browser, a presentation of the generated domain name comprising the top level domain, the second level domain, the nth level domain and/or the sub domain (Step 140).

Figure 2:
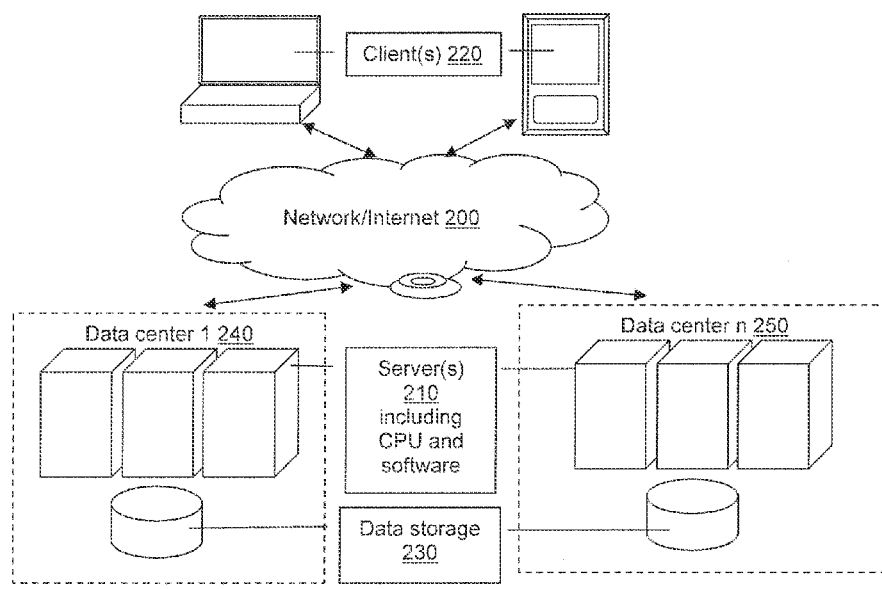
FIG. 2 illustrates a possible embodiment of a system for recommending top level, second level, nth level and/or sub domains.

Several different environments may be used to accomplish the steps of embodiments disclosed herein. FIG. 2 demonstrates a streamlined example of such an environment and illustrates a non-limiting example of a system and/or structure that may be used to accomplish the methods and embodiments disclosed and described herein. Such methods may be performed by any central processing unit (CPU) in any computing system, such as a microprocessor running on one or more servers 210 and/or one or more clients 220, and executing instructions stored (perhaps as scripts and/or software, possibly as software modules) in computer-readable media accessible to the CPU, such as a hard disk drive on a server(s) 210 and/or client(s) 220.

The example embodiments herein place no limitations on whom or what may comprise users. Thus, as non-limiting examples, users may comprise any individual, entity, business, corporation, partnership, organization, governmental entity, and/or educational institution.

The example embodiments shown and described herein exist within the framework of a network 200 and should not limit possible network configuration or connectivity. Such a network 200 may comprise, as non-limiting examples, any combination of the Internet, the public switched telephone network, the global Telex network, computer networks (e.g., an intranet, an extranet, a local-area network, or a wide-area network), a wired network, a wireless network, a telephone network, a corporate network backbone or any other combination of known or later developed networks.

At least one server 210 and at least one client 220 may be communicatively coupled to the network 200 via any method of network connection known in the art or developed in the future including, but not limited to wired, wireless, modem, dial-up, satellite, cable modem, Digital Subscriber Line (DSL), Asymmetric Digital Subscribers Line (ASDL), Virtual Private Network (VPN), Integrated Services Digital Network (ISDN), X.25, Ethernet, token ring, Fiber Distributed Data Interface (FDDI), IP over Asynchronous Transfer Mode (ATM), Infrared Data Association (IrDA), wireless, WAN technologies (T1, Frame Relay), Point-to-Point Protocol over Ethernet (PPPoE), and/or any combination thereof.

The server(s) 210 and client(s) 220 (along with software modules and the data storage 230 disclosed herein) may be communicatively coupled to the network 200 and to each other in such a way as to allow the exchange of information required to accomplish the method steps disclosed herein, including, but not limited to receiving the information from a user interface on one or more clients 220, and one or more servers 210 receiving the information as transmitted by the client(s) 220.

The client 220 may be any computer or program that provides services to other computers, programs, or users either in the same computer or over a computer network 200. As non-limiting examples, the client 220 may be an application, communication, mail, database, proxy, fax, file, media, web, peer-to-peer, or standalone computer, cell phone, "smart" phone, personal digital assistant (PDA), etc. which may contain an operating system, a full file system, a plurality of other necessary utilities or applications or any combination thereof on the client 220. Non limiting example programming environments for client applications may include JavaScript/AJAX (client side automation), ASP, JSP, Ruby on Rails, Python's Django, PHP, HTML pages or rich media like Flash, Flex, Silverlight, any programming environments for mobile "apps," or any combination thereof.

The client computer(s) 220 which may be operated by one or more users and may be used to connect to the network 200 to accomplish the illustrated embodiments may include, but are not limited to, a desktop computer, a laptop computer, a hand held computer, a terminal, a television, a television set top box, a cellular phone, a wireless phone, a wireless hand held device, a "smart" phone, an Internet access device, a rich client, thin client, or any other client functional with a client/server computing architecture. Client software may be used for authenticated remote access to one more hosting computers or servers, described below. These may be, but are not limited to being accessed by a remote desktop program and/or a web browser, as are known in the art.

Figure 4:
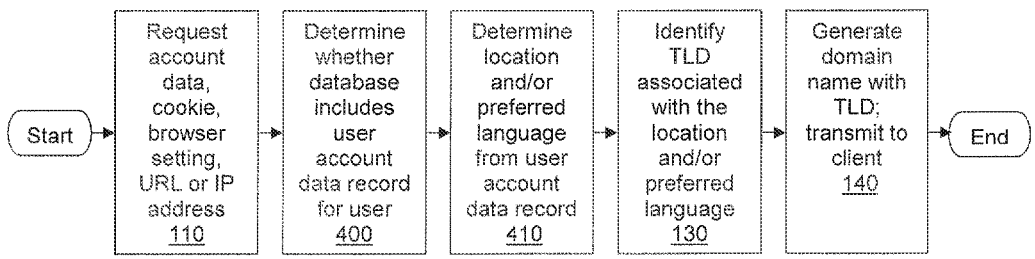
FIG. 4 is a flow diagram illustrating a possible embodiment of a method for recommending top level, second level, nth level and/or sub domains.
Figure 5:
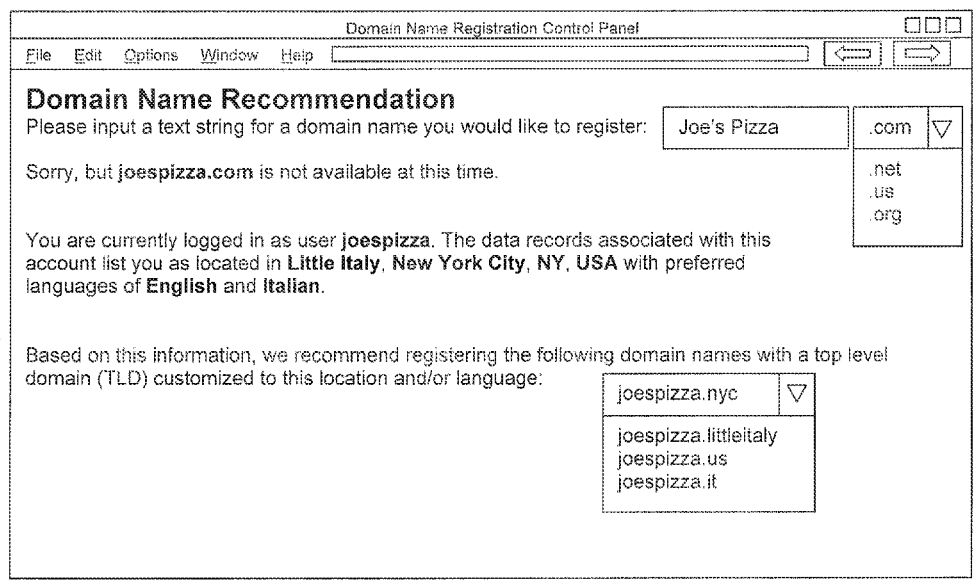
FIG. 5 is an example interface illustrating a possible embodiment of a system and method for recommending top level, second level, nth level and/or sub domains.
Figure 6:
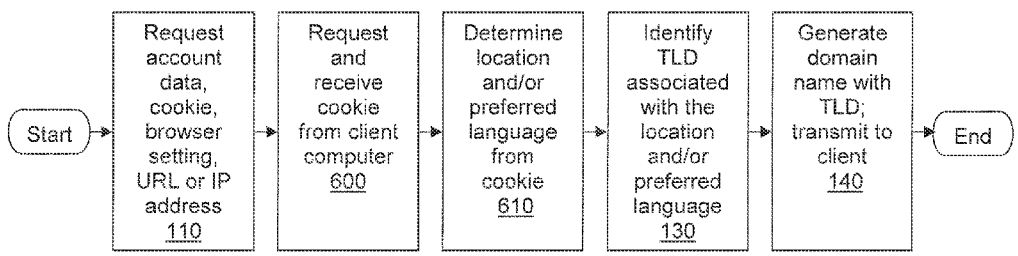
FIG. 6 is a flow diagram illustrating a possible embodiment of a method for recommending top level, second level, nth level and/or sub domains.
Figure 7:
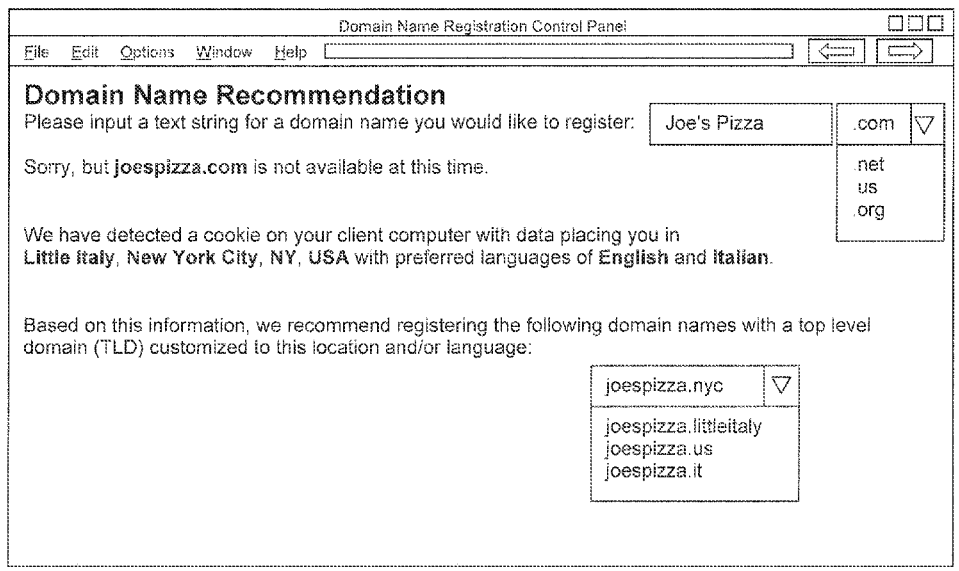
FIG. 7 is an example interface illustrating a possible embodiment of a system and method for recommending top level, second level, nth level and/or sub domains.
Figure 8:
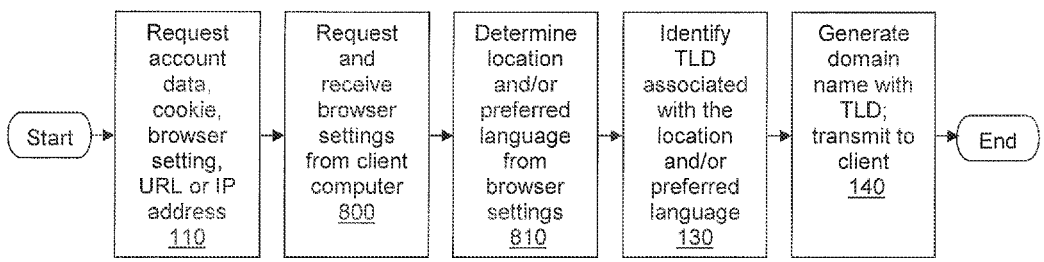
FIG. 8 is a flow diagram illustrating a possible embodiment of a method for recommending top level, second level, nth level and/or sub domains.
Figure 9:
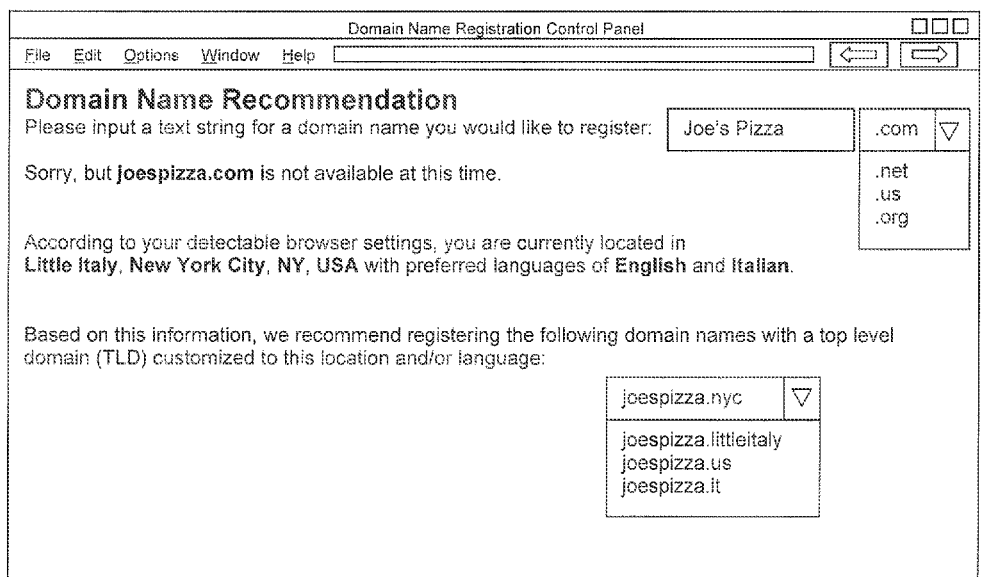
FIG. 9 is an example interface illustrating a possible embodiment of a system and method for recommending top level, second level, nth level and/or sub domains.
Figure 10:
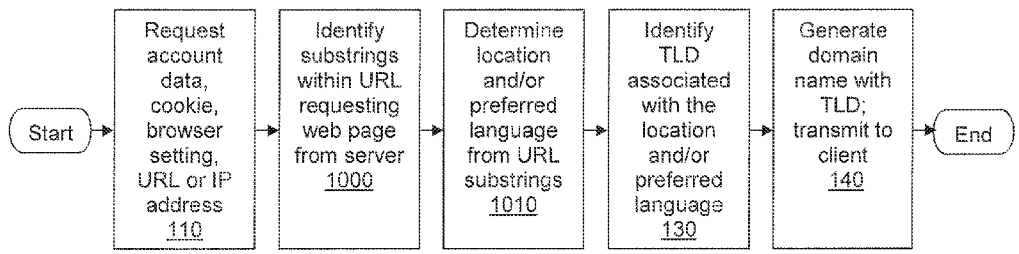
FIG. 10 is a flow diagram illustrating a possible embodiment of a method for recommending top level, second level, nth level and/or sub domains.
Figure 11:
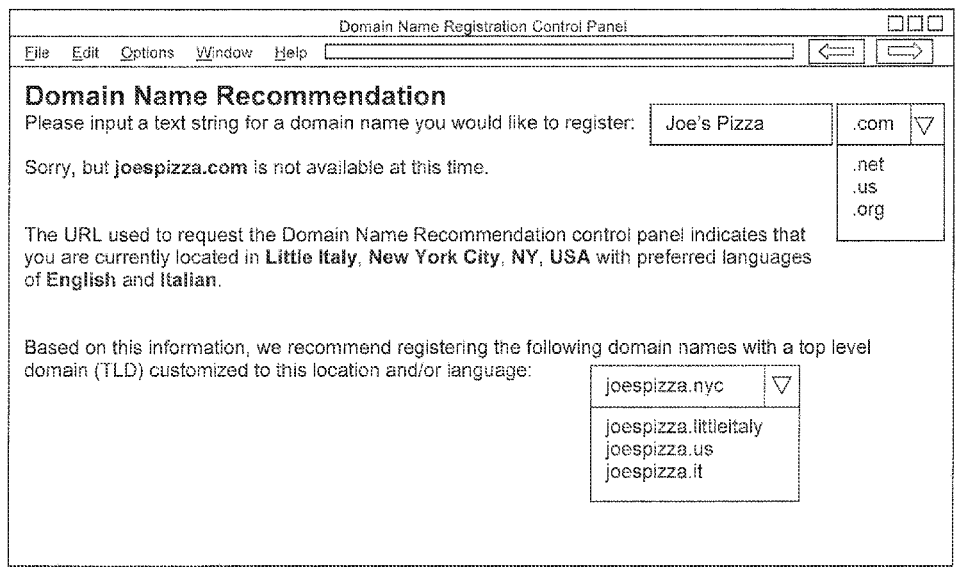
FIG. 11 is an example interface illustrating a possible embodiment of a system and method for recommending top level, second level, nth level and/or sub domains.
Figure 12:
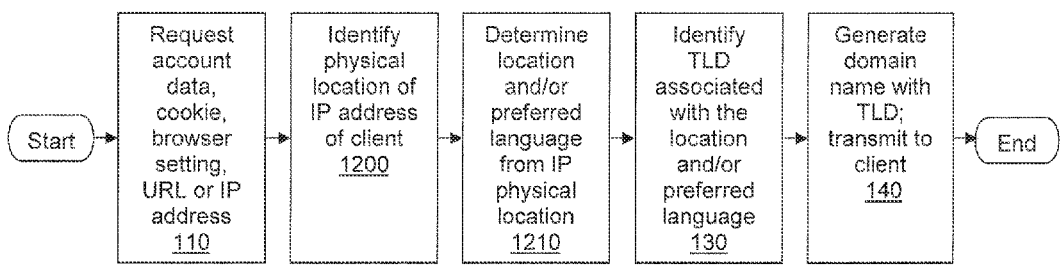
FIG. 12 is a flow diagram illustrating a possible embodiment of a method for recommending top level, second level, nth level and/or sub domains.
Figure 13:
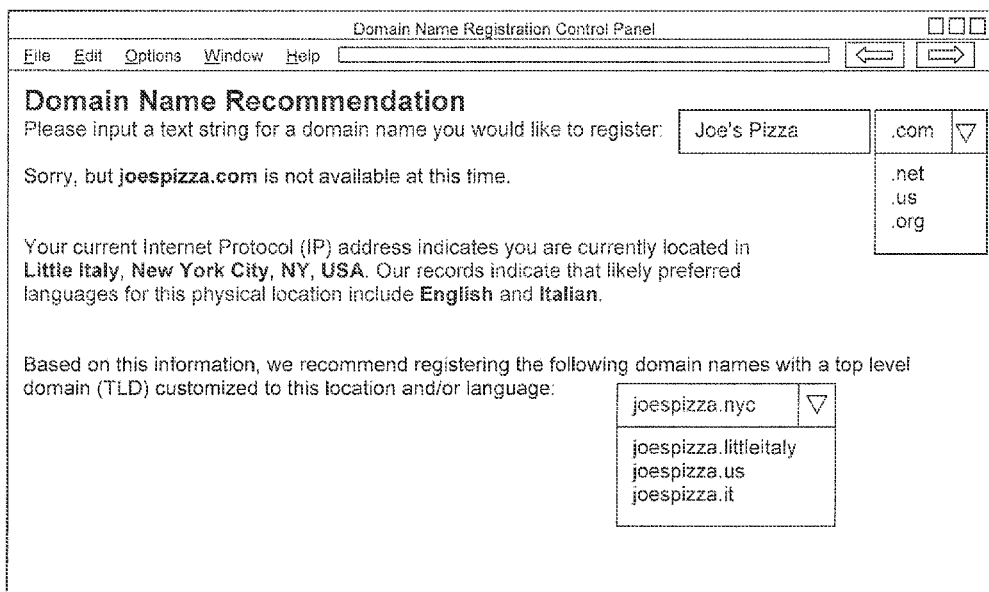
FIG. 13 is an example interface illustrating a possible embodiment of a system and method for recommending top level, second level, nth level and/or sub domains.

The user interface displayed on the client(s) 220 or the server(s) 210 may be any graphical, textual, scanned and/or auditory information a computer program presents to the user, and the control sequences such as keystrokes, movements of the computer mouse, selections with a touch screen, scanned information etc. used to control the program. Examples of such interfaces include any known or later developed combination of Graphical User Interfaces (GUI) or Web-based user interfaces as seen in and after FIG. 4, including Touch interfaces, Conversational Interface Agents, Live User Interfaces (LUI), Command line interfaces, Non-command user interfaces, Object-oriented User Interfaces (OOUI) or Voice user interfaces. Any information generated by the user, or any other information, may be accepted using any field, widget and/or control used in such interfaces, including but not limited to a text-box, text field, button, hyper-link, list, drop-down list, check-box, radio button, data grid, icon, graphical image, embedded link, etc.

The software modules used in the context of the current invention may be stored in the memory of—and run on—at least one server 210 and/or client 220. The software modules may comprise software and/or scripts containing instructions that, when executed by a microprocessor on a server 210 and/or client 220, cause the microprocessor to accomplish the purpose of the module or the methods disclosed herein. The software modules may also include mobile applications, possibly on a client computer and/or mobile device. These mobile applications, or "apps" may comprise computer software designed to help people perform an activity and designed to help the user to perform singular or multiple related specific tasks. It may help to solve problems in the real world by manipulating text, numbers, graphics, or a combination of these elements.

Figure 3:
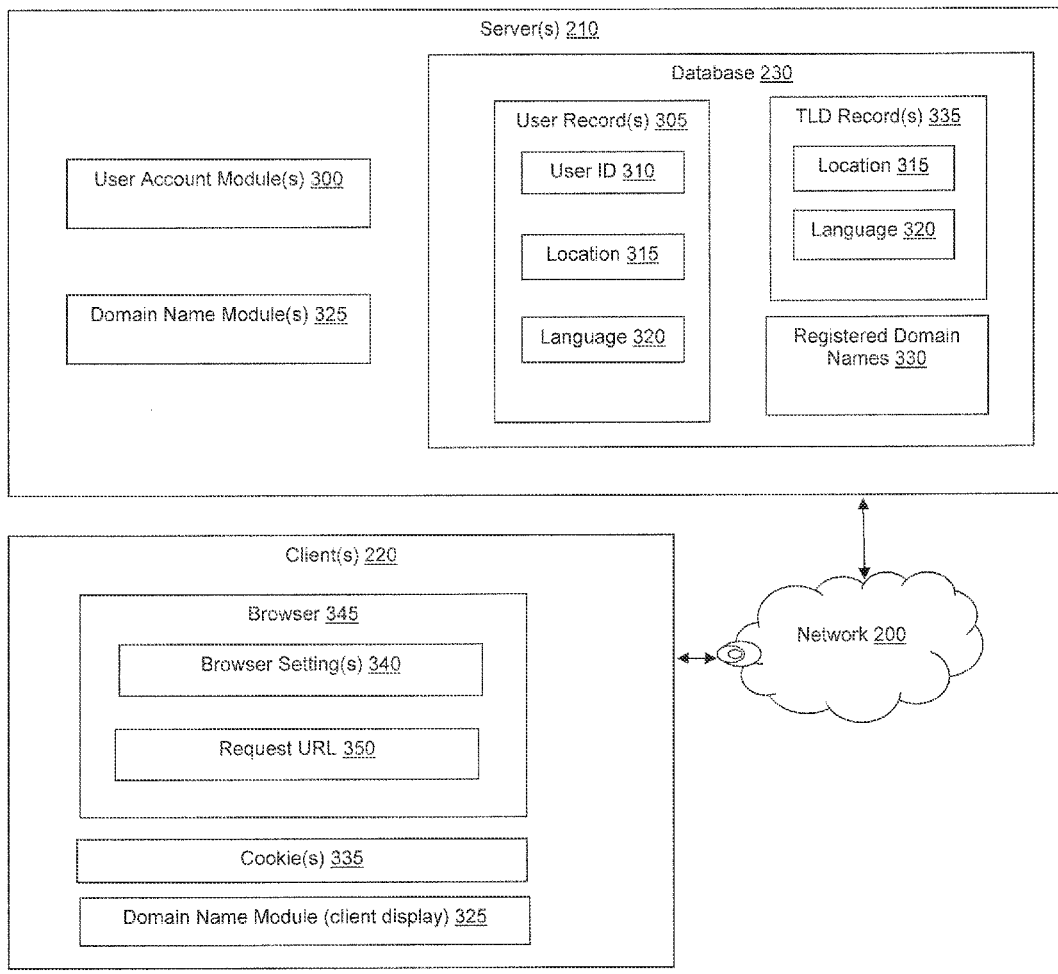
FIG. 3 illustrates a more detailed possible embodiment of a system for recommending top level, second level, nth level and/or sub domains.

The environment(s) in FIGS. 2-3 may include one or more centralized software modules capable of connecting to any type of software within the environment. In some embodiments, this centralized software may comprise an Application Programming Interface (API) and any request to the API disclosed herein may comprise a Remote Procedure Call (RPC) to the API. An API may comprise a service made available to third parties, which may further comprise any individual, entity, system, hardware, or software wishing to access the disclosed information and functionality. Such an API may comprise a software-to-software interface that specifies the protocol defining how independent computer programs interact or communicate with each other. It also may comprise a collection of pre-configured building blocks allowing a third party to easily configure their software for compatibility and/or extensibility. The API may allow a requesting party's software to communicate and interact with the software application and/or its provider—perhaps over a network—through a series of function calls (requests for services). It may comprise an interface provided by the software application and/or its provider to support function calls made of the software application by other computer programs.

The API may comprise any API type known in the art or developed in the future including, but not limited to, request-style, Berkeley Sockets, Transport Layer Interface (TLI), Representational State Transfer (REST), Simple Object Access Protocol (SOAP), RPCs, Standard Query Language (SQL), file transfer, message delivery, and/or any combination thereof. The API may comprise computer-readable code that, when executed, causes the API to receive an RPC (i.e., function call) requesting information services. Responsive to receipt of the RPC, the API may perform the above described processes, and transmit a request results to the requesting third party. To submit the request via an RPC to the API, the server(s) 210 may require authentication with the API. Computers or servers may locate the API via an access protected URL mapped to the API, and may then use an API key configured to authenticate the one or more computers or servers prior to accessing the API.

The server(s) utilized within the disclosed system 210 may comprise any computer or program that provides services to other computers, programs, or users either in the same computer or over a computer network 200. As non-limiting examples, the server 210 may comprise application, communication, mail, database, proxy, fax, file, media, web, peer-to-peer, standalone, software, or hardware servers (i.e., server computers) and may use any server format known in the art or developed in the future (possibly a shared hosting server, a virtual dedicated hosting server, a dedicated hosting server, a cloud hosting solution, a grid hosting solution, or any combination thereof). The server(s) 210 may exist within a server cluster, as illustrated. These clusters may include a group of tightly coupled computers that work together so that in many respects they can be viewed as though they are a single computer. The components may be connected to each other through fast local area networks which may improve performance and/or availability over that provided by a single computer.

The server(s) 210 or software modules within the server(s) 210 may receive hypertext transfer protocol (HTTP) requests for files or other data stored on the server(s) 210 and may use server-side scripting languages such as ASP, PHP, CGI/Perl, proprietary scripting software/modules/components etc. to render the files requested and respond with the rendered files/pages to be displayed on the client(s) 220.

The server(s) 210 or software modules within the server(s) 210 may use query languages such as MSSQL or MySQL to retrieve the content from data storage 230. Server-side scripting languages such as ASP, PHP, CGI/Perl, proprietary scripting software/modules/components etc. may be used to process the retrieved data. The retrieved data may be analyzed in order to determine information recognized by the scripting language, information to be matched to those found in data storage, availability of requested information, comparisons to information displayed and input/selected from the user interface or any other content retrieval within the method steps disclosed herein.

The server 210 and/or client 220 may be communicatively coupled to data storage 230 to retrieve any information requested. The data storage 230 may be any computer components, devices, and/or recording media that may retain digital data used for computing for some interval of time. The storage may be capable of retaining stored content for any data requested, on a single machine or in a cluster of computers over the network 200, in separate memory areas of the same machine such as different hard drives, or in separate partitions within the same hard drive, such as a database partition.

Non-limiting examples of the data storage 230 may include, but are not limited to, a Network Area Storage, ("NAS"), which may be a self-contained file level computer data storage connected to and supplying a computer network with file-based data storage services. The storage subsystem may also be a Storage Area Network ("SAN"—an architecture to attach remote computer storage devices to servers in such a way that the devices appear as locally attached), an NAS-SAN hybrid, any other means of central/shared storage now known or later developed or any combination thereof.

Structurally, the data storage 230 may comprise any collection of data. As non-limiting examples, the data storage 230 may comprise a local database, online database, desktop database, server-side database, relational database, hierarchical database, network database, object database, object-relational database, associative database, concept-oriented database, entity-attribute-value database, multi-dimensional database, semi-structured database, star schema database, XML database, file, collection of files, spreadsheet, and/or other means of data storage such as a magnetic media, hard drive, other disk drive, volatile memory (e.g., RAM), non-volatile memory (e.g., ROM or flash), and/or any combination thereof.

As seen in FIG. 2, the software modules, server(s) 210 and/or data storage 230 may exist and/or be hosted in one or more data centers 240, 250. These data centers 240, 250 may provide hosting services for websites, services or software relating to stored information, or any related hosted website including, but not limited to hosting one or more computers or servers in a data center 240, 250 as well as providing the general infrastructure necessary to offer hosting services to Internet users including hardware, software, Internet web sites, hosting servers, and electronic communication means necessary to connect multiple computers and/or servers to the Internet or any other network 200.

As users access and/or input information, this information may be redirected and distributed between and among the data centers 240, 250 via commands from any combination of software modules hosted on the server(s) 210 and executed via processors on the server(s) 210. This information may then be accessed and manipulated by the combination of software modules or stored in the data storage 230 of any of a plurality of data centers, either separate from or integrated into the one or more servers, so that the information is available to be searched and accessed by the user and/or any other components of any or all data centers.

Any references to "software combination," "combination of software," "combination of software modules" etc. referred to herein may include any combination of software modules executed by a microprocessor on either the server 210 or client 220 computers. These software modules may also be used in combination with any other method steps, hardware and/or software structures disclosed herein. The servers 210 may be hosted in any data center 240, 250 operated by any hosting provider such as those disclosed herein and the servers 210 and clients 220 may be operated by any users disclosed herein.

In the interest of simplicity, FIG. 3 shows a consolidated environment for accomplishing the methods disclosed herein, where the components of the system are all hosted on a single server computer 210 in a single data center 240, 250. Other embodiments, however, may utilize a highly distributed environment wherein the various system components are each hosted on their own separate server 210 and communicatively coupled to one another via the network 200. Thus, any combination of the disclosed software may be hosted on any combination of server(s) 210 and communicatively coupled to the network 200.

As seen in FIG. 3, the server(s) 220 may host and run one or more user account software modules 300. These user account module(s) 300 may be configured to access an administrative account for a user of the services provided by a business entity (e.g., GO DADDY'S MANAGE YOUR ACCOUNT administration software, as a non-limiting example). This account may also be known as a "user account," "customer account" or "shopper account" for a user.

Non-limiting examples of the business entities that may provide these services may include a domain name registry, a domain name registrar, a hosting provider, a secure sockets layer (SSL) or other online security Certification Authority (CA), a software development or e-commerce company, etc. Non-limiting examples of the services provided by such a service provider may include, as non-limiting examples, domain name registration and maintenance services, web hosting and maintenance services, website development and maintenance services, SSL certificate validation, signing and issuance services, installation of SSL certificates on hosted websites, DNS services (e.g., domain name/URL resolution, and/or hosting a DNS software, database server, relevant zone, or other DNS files and/or a DNS database), email services, calendaring/scheduling services, online storage services, fax services, etc. Any combination of these services may be provided by a single service provider.

The user account module(s) 300 may provide access to the service provider's services via the administrative user account. As non-limiting examples, the user account module(s) 300 may provide access to an administrative account and/or server-generated control panel interface for each of the various services provided through the user account. These one or more control panel interfaces may be accessible via any client 220 and may comprise, as non-limiting examples, a web page, a client side program, an "app," a server administration interface, etc. In some embodiments, access to the services may be provided via one or more administration and/or control panel interfaces, possibly generated by the server(s) 210 and transmitted to clients 220 as webpages accessible via the Internet.

To create a user account, the user account module(s) 300 may be configured to generate and transmit, for display on the client(s) 220, a user account signup interface, possibly a web page or other client-side user interface. The signup interface may be configured to receive, from the user, a request to create a user account, including a username and password for the user account. The signup interface may be further configured to receive additional information from and about the user, including contact information such as a phone number, SMS messaging contact information, email address, etc.

The signup interface may further be configured to transmit the user's information to the server(s) 210. The server(s) 210 may receive this information, and store the information in a database 230 or other storage system, as described herein. In some embodiments, such as that shown in FIG. 3, the information may be stored as a user account data record 305 within the database 230, possibly in a user account data table. Each user account record 305 stored in the database 230 may be assigned a unique user account identification ("user ID," sometimes referred to as a customer ID or a shopper ID) 310. In some embodiments, this user ID 310 may be a unique number auto-generated and assigned, by the database, to the record created for the user account 305 in the database 230, the user ID 310 for each record being auto-incremented from the last. In other embodiments, the user account module(s) 300 may assign each new user account a unique user ID 310. The user ID 310 may be included (possibly as a foreign key) within all records stored in the database 230 that are associated with this "master" user account.

The user may create an account according to any means of user information collection known in the art. As a non-limiting example, the user account may be created via a purchase path for one or more products available from the service provider. The user may request, and the server(s) 210 may receive the request from the client(s) 220, to create the user account for the user.

During this user account creation process, the user may be prompted to create and/or select a username and a password. This username and password may be used to authenticate the user when the user accesses the products provided by the service provider, including the domain name software module(s) 325 disclosed herein. As a non-limiting example, to access the disclosed domain name software module(s) 325, the user may be prompted for the username and password. After a client 230 transmits the username and password to the server computer, the server(s) 210 may search the database 230 to determine if the received username and password exist within a user account record 305 stored in the database 230. If so, the server(s) 210 may authenticate the user to the domain name software module 325.

The user may also provide additional personal information during the account creation process. As a non-limiting example, and for purposes of the disclosed invention, the user may provide a location 315 of the user and/or the client(s) 220 being operated by the user and/or a preferred language 320 for the user. The server(s) 210 may therefore be configured to request, receive and/or store in the database 230, a user account record 305 comprising a username for the user, a password for the user, the location 315 of the user/client and/or the preferred language 320 of the user.

The location 315 information may comprise any location 315 provided by the user or detectible by techniques described herein or known in the art. Non-limiting examples of such a location 315 may include the user's continent, country, region, state, province, county, city, neighborhood, street address, zip or postal code, etc. or any combination thereof.

As a non-limiting example: Joe, an owner of a pizza restaurant and a user of the disclosed system, may operate his business from Little Italy, New York City, New York, USA. As he sets up his user account, he may provide a username "joespizza" and password "pepperoni." As prompted, he may include his preferred languages 320 as English and Italian and may include his location 315 as 123 Restaurant Road, Little Italy, New York City, N.Y., USA. Joe may also provide additional details about his address, phone number or any other contact or personal information to be included in the user account data record 305.

The user can also provide additional information describing a business or other entity associated with the user and for which the user may ultimately search for a domain name. For example, the user may provide the name of the user's business or a business employing the user. The user can then provide additional information describing the business such as its size, location (e.g., mailing address of the business' headquarters, GPS coordinates, city, or any other location information), and any other information relevant to the business. In some embodiments, a type or category of the user's business may also be stored in the user's account information. The user may explicitly select and identify the category of the user's business, such as via a selection menu provided during an account creation process.

The category of the user's business may specify the type of organization (e.g., non-profit, for-profit, governmental) as well as a description of the specific market or vertical in which the business operates (e.g., law-firm, bike shop, catering company). In various embodiments of the present system, the business categorization can be as broad or narrow as desired and may, in some cases, include multiple categorizations of different breadth and/or type for a single business or other entity. In circumstances where the user does not have or is not affiliated with a business, the user's account may be otherwise categorized. For example, the user may wish to register a domain name for a personal or family photograph blog. In that case, the category information provided by the user may be one of "personal", or "photo-blog." Accordingly, not only may a category be specified based upon a business that is to be affiliated with a domain name, but, if no such business exists, a category may be selected based upon the genre of website that is to be hosted at the domain name.

As mentioned above, the category of the user's business may be specified explicitly by the user. In other embodiments, however, the category may be inferred or otherwise determined by the service provider based upon available information. For example, if the category is not explicitly specified, the service provider may utilize servers 210 to perform keyword analysis of a website associated with the user's account to identify keywords stored therein that may indicate that the user is affiliated with a business or other entity belonging to a particular category. For example, if the website includes a number of keywords that are commonly found on the web pages of online bike shops, the presence of those keywords on the user's website may allow the service provider to infer that the user's business is a bike shop. Then, having made such a determination, the service provider may determine that the user is shopping for an additional domain name for the bike shop.

Similarly, if, during the construction of the user's website, the user selected particular website templates that are associated with particular types of businesses, the selection of those templates may be used to infer that the user's business belongs in a particular category. For example, if the user selected a "small law firm" template when constructing the website, the service provider can use that information to infer that the user is affiliated with a small law firm.

One non-limiting example of the products/services offered by the service provider may include registering domain names for users/customers. In some embodiments, this service may be provided by a registrar capable of registering domain names. As non-limiting examples, the service provider may be a registrar for generic TLDs (gTLD) such as .com, .net, .edu, .org, etc. In the context of the current invention, the registrar may also be a registrar of customized gTLDs such as .domainnames, .godaddy, .nyc, .newyork, .littleitaly etc. or country-code TLDs (ccTLD) and/or ccTLDs that have an affinity for a specific language or set of languages and or locale. Non limiting examples may include .us, .it, etc. Registrars may need to take the steps necessary to qualify as registrars for these customized TLDs and/or ccTLDs according to qualifying steps known in the art.

The registrar may store, in the database 230, information about domain names registered with the registrar and the TLDs associated with the domain names (and for which the registrar is authorized to register) 330. As non-limiting examples, the registrar may store one or more TLD records 335 in the database 230 for each of the TLDs for which that the registrar is qualified and authorized to register. Within these one or more TLD records 335, the registrar may associate the TLD that is the subject of the record(s) 335 with one or more locations 315 and/or one or more languages 320. In some embodiments, the location(s) 315 and/or languages 320 associated with the TLD in the database may be stored in one or more records (not shown) corresponding to the one or more TLD records 335. In addition to registering domain names and storing information about the domain name registrations, the registrar may also store data and/or have access to data about all names in the root.

The registrar may store one or more records of registered domain names 330. As non-limiting examples, the records of registered domain names 330 may comprise zone files downloaded from a domain name registry. Likewise, records of registered domain names 330 may comprise records within a registrar database 330 created and/or updated each time a new domain name is registered (or transferred, perhaps via domain name aftermarket) with the registrar. No limitations should be placed on the manner in which the domain name module 325 determines the availability of domain names. As non-limiting examples, the domain name module(s) 325 may determine available domain names to be those domain names not listed in the zone files and/or found in the database 230 for a particular text string combined with a TLD.

The user may access, possibly after authenticating to their user account, one or more domain name software modules 325 running on the server(s) 210. The domain name module(s) 325 may comprise a component for recommending, registering and/or administrating domain names. This component may further comprise a module for recommending a domain name and/or TLD if a domain name requested by a user is determined to be unavailable. Recommendations for domain names may include domain names that have not yet been registered, domain names available in a domain name aftermarket and/or services for contacting current domain owners to determine if the current registrant is willing to sell their domain name(s).

As seen in the non-limiting examples in FIGS. 5, 7, 9, 11, 13, 14, 16, and 21 a user interface/control panel for the domain name software module(s) 325 may be displayed on the client(s) 220. The user interface/control panel for the domain name module(s) 325 may be configured to receive one or more requested domain names from a user. As seen in FIGS. 5, 7, 9, 11, 13, 14, 16, and 21, the requested domain name may comprise a text string and/or a selected TLD received from the user and transmitted to the domain name module(s) 325. This text string may comprise a specific domain or a plurality of random terms and may be used to identify one or more related domain names that are available or soon will be available for registration.

In some embodiments, the requested domain name and/or keywords may be received by alternative user interfaces and transmitted to the domain module(s) 325 for candidate domain name generation. For example, keywords may be entered by the user into the search text entry box of an Internet search engine (e.g., GOOGLE, BING). After the keywords have been submitted to the domain module(s) 325, the candidate domain names generated by the domain module(s) 325 may then be displayed along with the results of the Internet search. As such, once a search is performed, the user may be provided with a listing of relevant web pages to the search (i.e., a conventional set of Internet search results), as well as a listing of candidate domain names that are relevant to the search keywords. The user could then elect to select one or more of the candidate domain names displayed along with the search results for registration. In this case, if the a user were to perform an Internet search for "how to open a pizza restaurant in Phoenix Ariz.", in addition to the standard search results, the user may be presented with the option to register domain names such as "phoenix-pizza.com", "pizza,arizona", "azpizza.net", and the like.

In some other cases, the requested domain name and/or keywords may be identified without the user explicitly supplying them via a search for candidate domain names. For example, when the user attempts to visit a web page that does not exist, resulting in a 404 error page being displayed, the URL that the user attempted to visit could be parsed into a number of keywords that may be utilized to execute a candidate domain name search (e.g., performed by domain module(s) 325). The results of that search (i.e., a listing of candidate domain names) could then be displayed on the 404 error page along with the error message. The candidate domain names displayed on the 404 error page could then be selected by the user for registration.

The domain name module(s) 325 may be configured to receive the requested domain name or keywords from the user interface on the client(s) 220 (or other source of the domain name or keywords) and search the records of registered domain names 330 to determine if the requested domain name or domain names relevant to the keywords are available. If any such domain names are available, the domain name module(s) 325 may be configured to receive a request/selection by the user to register one of the domain names and may be further configured to register the domain name and/or administrate the domain name according to any technique for domain name registration and/or administration known in the art.

Continuing the non-limiting example above, and as seen in FIGS. 5, 7, 9, 11 and 13, a user may type the string "Joe's Pizza" (or alternatively "joespizza") into a user interface element (possibly a text box) on the user interface. In the illustrated non-limiting embodiments, the user may also select a TLD associated with the entered text string as part of the domain name search (e.g., ".com" is selected from a drop down in these non-limiting examples). The displayed control panel may then be configured to transmit the entered form data to the domain name module 325 running on the server(s) 210. If joespizza.com is available for registration, the domain name module(s) 325 may be configured to transmit, for display on the client(s) 220, a notification that the domain name is available, and guide the user through the process of registering joespizza.com.

However, if the requested domain name is not available for registration, the domain name module(s) 325 may be configured to calculate, identify and generate alternative domain names to be suggested to the user. The alternative and/or additional "spun" domain name may comprise either one or more similar domain names with the same TLD and/or one or more available domain names with a different TLD. If the "spun" domain name(s) are selected by the user, the domain name module(s) 325 may be configured to register the domain name(s) selected by the user, and administrate the registered domain names accordingly.

Continuing the non-limiting example above, the domain name module(s) 325 may be configured to determine that, if joespizza.com is not available, joespizza.net or joespizza.us are available, and may transmit these suggested domain names to the client(s) 220 for display. The domain name module(s) 325 may be configured to receive a selection of an available domain name and guide the user through the process of registering and administrating joespizza.com.

In embodiments recommending one or more domains with the same (or a different) string and a different TLD, the domain name module(s) 325 and/or the server(s) 210 may be configured to recommend the TLD, SLD, nth level domain and/or sub domain according to the location 315 of the client(s) 220 and/or the preferred language 320 of the user of the client(s) 220. The location 315 of the client(s) 220 should not be limited. As non-limiting examples, any location from an individual residence to a continent may be included in the definition of a client location, including, but not limited to a housing development, neighborhood, borough, city, county, zip code, state, country, etc.

Thus, the disclosed inventions may recommend location and/or language specific SLDs, nth level domains and/or subdomains according to a more "granular" approach to recommending available (or soon to be available) domain names, including specific ccTLDs or gTLDs. Continuing the example above, if Joe has a restaurant in Little Italy in New York City, and joespizza.com is not available for registration, the domain name module(s) 325 may be configured to determine Joe's location 315 and/or preferred language 320 and recommend alternative domain names using location and/or language specific TLDs, SLDs, nth level domains and or sub domains, such as joespizzalittleitaly.nyc, nycjoespizza.littleitaly, joespizza.nyc, joespizza.newyork, joespizza.littleitaly, joespizza.us, joespizza.it, etc., as non-limiting examples.

To recommend the TLD according to the location 315 and/or the preferred language 320, the domain name module(s) 325 may be configured to determine the location 315 of the client(s) 220 and/or a preferred language 320 for the user of the client(s) 220 and generate domain name recommendations based on the TLDs 335 associated in the database 230 with the location 315 and/or preferred language 320. To accomplish this, the domain name module(s) 325 may be configured to determine the location 315 or preferred language 320 based upon: i) a user account for the user; ii) a browser cookie 335 stored on the client computer 220; iii) at least one browser setting 340 for a browser 345 running on the client computer 220; iv) a URL entered into the browser 350; and/or v) an internet protocol address of the client computer 220 on a network 200.

The domain name module(s) 325 may be configured to recommend the SLD, nth level domain and/or sub domain within the domain name according to any domain name suggestion techniques known in the art. As a non-limiting example, to recommend an SLD, nth level domain and/or sub domain according to the location 315 and/or the preferred language 320, the domain name module(s) 325 may be configured to identify, within the text string from the request to determine the availability of the domain name, one or more keywords. The domain name module(s) 325 may be further configured to generate the SLD, nth level domain and/or sub domain from the identified keyword(s), so that the SLD, nth level domain and/or sub domain within the recommended domain name comprises the identified keyword(s).

The domain name module(s) 325 may then be configured to identify the location 315 and/or preferred language 320 according to steps disclosed herein, and may include the location 315 and/or preferred language 320 as a text string within the generated SLD, nth level domain and/or sub domain. In some embodiments, the location 315 and/or preferred language 320 may be appended as a prefix or a suffix to the keyword(s) within the generated SLD. The SLD, nth level domain and/or sub domain may then be concatenated to any gTLD, ccTLD or other TLD to complete the full domain name. In some embodiments, the SLD, nth level domain and/or sub domain may be concatenated to a TLD generated based on the location 315 and/or preferred language 320 as disclosed herein.

From the non-limiting example disclosed herein, the domain name module(s) 325 may be configured to receive the example text string "Joe's Pizza" or "joespizza" from the domain name module(s) 325 user interface. The domain name module(s) 325 may be configured to identify, within the text string, the keywords "joes" and "pizza," and may generate the SLD "joespizza" from these keywords. The SLD "joespizza" may then be combined with a text string representing the location 315 and/or preferred language 320, which may be appended as a prefix or suffix to the keywords, resulting in "joespizzalittleitaly" or "nycjoespizza," as non-limiting examples. The SLD may then be concatenated to a TLD, possibly based on the location 315 and/or preferred language 320, thereby generating the domain names joespizzalittleitaly.nyc or nycjoespizza.littleitaly, as non-limiting examples.

In some embodiments, the domain name module(s) 325 are configured to further utilize the preferred language 320 in spinning or generating candidate domain names. This may involve analyzing the text string to identify keywords. Then, once the keywords have been identified domain names can be spun by identifying words that are relevant to the keywords in the preferred language 320. In the present examples, the text string includes the keywords joes and pizza. As such, the spinning process may involve identifying words that are relevant to the word pizza. In this example, where the preferred languages can include English and Italian, relevant words may include "restaurant" as well as "ristorante". As such, candidate SLDs may include the English "joespizzarestaurant" and the Italian, "joespizzaristorante." When spinning domains, English SLDs may be associated with an English or predominantly English TLD (e.g., .com, or .us) and Italian SLDs be associated with an Italian TLD (e.g., .it).

Not only can the preferred language 320 be utilized to generate both SLDs and TLDs, but the preferred language 320 may also be used to spin domain names that use characters specific for the preferred language 320. For example, if the preferred language 320 uses a Cyrillic alphabet, then the domain names module(s) 325 can be configured to generate TLD, SLD, nth level domain and/or sub domain combinations that includes words, phrases, or acronyms that employ Cyrillic characters. Similarly, domain names that include other accented characters (such as in latin scrip—e.g., é for café) may be generated.

The domain name module(s) 325 may then be configured to compare the generated SLD/TLD combination to the registered domain name data in the database 230 to determine if the generated suggested domain names have already been registered. If not, the SLD/TLD combination may be transmitted to the client(s) 220 for display as a suggested domain name.

In some embodiments, the sources used to determine the location 315 of the client(s) 220 and/or the preferred language 320 for the user of the client(s) 220 (i.e. user record 305, cookie(s) 335, browser setting(s) 340, URL 350, IP address, etc.) may be utilized in a "cascading" order. As a non-limiting example, the domain name module(s) 325 and/or the server(s) 210 may first determine whether a user account data record 305 exists for the user, and identify the location 315 and/or the preferred language 320 from the user account data record 305. If no user account data record 305 exists for the user, the domain name module(s) 325 and/or the server(s) 210 may determine whether one or more cookies 335 have been stored on the client(s) 220 and determine the location 315 and/or preferred language 320 from the cookie(s) 335. If no cookie 335 exists on the server, the domain name module(s) 325 and/or the server(s) 210 may determine the location 315 and/or preferred language 320 from one or more browser settings 340 and so forth.

In embodiments that determine the location 315 and/or preferred language 320 based upon a user account for the user, the domain name module(s) 325 may be configured to determine whether the database 230 comprises one or more user account data record(s) 305 for the user. If so, the domain name module(s) 325 and/or server(s) 210 may be configured to identify, within the user account data record(s) 305, the location 315 and/or the preferred language(s) 320.

One non-limiting example of determining whether the database 230 comprises a user account data record 305 for the user may include the user account module(s) 325 and/or domain name module(s) 325 determining whether the user has been authenticated to a user account. In some embodiments, this authentication may be determined according to whether a session variable is included within a current session for the user. The user ID 310 session variable may indicate to the module(s) 300, 325 that the user has previously been authenticated by identifying the user ID 310 within a user account record 305 in the database 230.

In some embodiments, the user account record 305 comprising the user ID 310 may be identified according to a username/password combination submitted to the server 210. The server may then be configured to determine whether a user account data record 305 is found in the database comprising the username/password combination and/or the user ID 310 for the session.

In some embodiments, if no user ID 310 and/or username/password combination has been identified, the server(s) 210 may be configured to request and receive a username and/or password from the user, and determine whether a user account data record 305, comprising the username and/or password, exists within the database 230. If so, the user may be authenticated, and the data from the user account data record 305 may be made available to the user account module(s) 300 and/or the domain name module(s) 325.

Regardless of the method used, once the user account data record 305 is identified, a location 315 and/or preferred language 320 may be identified within the user account data record 305 if the user has previously provided such information. If the location 315 and/or preferred language 320 is found within the user account data record 305, the domain name module(s) 325 may be configured to identify one or more TLD's associated, within TLD data records 335 as described herein, with the location 315 and/or preferred language 320 in the user account data record 305. As seen in the non-limiting example embodiment shown in FIG. 5, the domain name module(s) 325 may be configured to generate one or more recommended domain names including the one or more TLDs 335, SLDs, nth level domains and/or sub domains associated with the location 315 and/or preferred language 320. These generated domain names may then be transmitted to the client(s) 220 for display on a user interface and/or control panel.

In embodiments that determine the location 315 or preferred language 320 based upon one or more cookies 335 stored on the client(s) 220, the domain name module(s) 325 may be configured to determine whether the cookie(s) 335 from a previous session are stored on the client(s) 220. If so, the domain name module(s) 225 and/or server(s) 210 may be configured to receive the cookie(s) 335 from the client 220 as the cookies are automatically sent by a browser. The domain name module(s) 325 may further be configured to identify, within the cookie(s) 335, the location 315 and/or the preferred language(s) 320.

In these embodiments, the server(s) 210 may generate and write one or more browser or other "cookies" 335 to the client(s) 220. The cookie(s) 335 may comprise data about a user's Internet session. The data about the user's session may comprise various information about the user, website, and or interactions between the user and various websites. During these interactions, the websites and/or server(s) 210 may write the cookie(s) 335 to the client(s) 220. The data within the cookie(s) 335 may comprise, as non-limiting examples, the location of the client computer 315 and/or a preferred language for a user of the client computer 320. As non-limiting examples, in some embodiments, the user may provide the location 315 and/or preferred language 320 written within the cookie(s) 335. In other embodiments, the cookie(s) 335 may be written by the server(s) 210 based upon a location 315 and/or or preferred language 320 as determined by particular visited websites and/or web pages. As non-limiting examples, the information from the websites may be determined via URL or browser settings as described below.

If the domain name module(s) 325 and/or server(s) 210 determine that the cookie(s) 335 have been stored on the client(s) 220 and comprise the location 315 and/or preferred language 320, the server(s) 210 may be configured to identify data within the cookie(s) 335 comprising the location 315 and/or preferred language 320. If the location 315 and/or preferred language 320 is found within the cookie(s) 335, the domain name module(s) 325 may be configured to identify one or more TLD's associated, within TLD data records 335 as described herein, with the location 315 and/or preferred language(s) 320. As seen in the non-limiting example embodiment shown in FIG. 7, the domain name module(s) 325 may be configured to generate one or more recommended domain names including the one or more TLDs, SLDs, nth level domains and/or sub domains associated with the location 315 and/or preferred language(s) 320. These generated domain names may then be transmitted to the client(s) 220 for display on a user interface and/or control panel.

In embodiments that determine the location 315 or preferred language 320 based upon one or more browser settings 340 stored within an Internet or other browser 345 running on the client(s) 220, the domain name module(s) 325 may be configured to request and/or receive, from the client(s) 220, the one or more browser settings 340. The browser 345 running on the client(s) 220 may include various settings and configuration information, which may include, as non-limiting examples, a geo location 315 of the client(s) 220 and/or a language preference 320 setting for the operator of the browser 345.

As a non-limiting example, the browser 345 may be "geo enabled," allowing the browser 345 to determine and store the physical location 315 of the client(s) 220. The location of the browser 345 may be determined using "geo location providers," which may provide requested geo location 315 information from a source provider (e.g., Google would be a source provider for users determining their geo location from Google's Chrome browser). The source provider may then provide the requested geo location 315 information. In other embodiments, the browser 345 may send local network 200 information to the source provider (e.g., Google Location Services) to get geo location 315 information. In other embodiments, the location can be inferred using other data. For example, if the user is using a mobile device to access the service provider, the service provider may be configured to determine a cellular network (e.g., phone or telecommunications network) being used by the user. The location of the user may then be determined to be within a region in which the cellular network operates. Alternatively, the service provider may analyze an Internet subnet from the user's request originated. The service provider can then translate that subnet to define a geographical region in which the user may be located.

The browser 345 may then store the geo location 315 information and/or share the client's 220 geo location 315 with the requesting server(s) 210. Using the browser's 345 geo location 315 settings, the browser may allow all sites to track the client's 220 physical location 315. Other non-limiting examples of location-based browser settings 340 may include Firefox: (e.g., {"location": {"latitude": 48.861426, 2.338929, "longitude": 2.338929, "accuracy": 20.0}}), or, if the browser 345 has a geo.enabled setting set to true, the physical location 315 information may be transmitted and/or pulled from the browser's 345 about:config information.

The browser settings 340 received by the server(s) 210 may also include a preferred language 320 for which website content displayed on the browser 345 is to be generated and displayed. As non-limiting examples, for Internet Explorer, the server(s) 210 may receive the values and/or settings from the browser's 345 Tools>Internet Options>General>Languages parameters. Likewise, for Firefox, the server(s) 210 may receive the values and/or settings from tools>options>content>languages and/or a window.navigator.language function to transmit a string representing the language version of the browser 345.

Regardless of the method used, once the browser settings for location 315 and/or preferred language 320 are be identified within the browser settings 340, the location 315 and/or preferred language 320 identified within the browser settings 340 may then be used to identify, within the database 230, one or more TLD's records 335 previously associated, within the database 230, with the location 315 or preferred language 320 as described herein.

If the server(s) 210 determine that the browser settings 340 have been stored on the client(s) 220 and comprise the location 315 and/or preferred language 320, the server(s) 210 may be configured to identify data within the browser setting(s) 340 comprising the location 315 and/or preferred language 320. If the location 315 and/or preferred language 320 is found within the browser settings 340, the domain name module(s) 325 may be configured to identify one or more TLD's associated, within TLD data records 335, with the location 315 and/or preferred language 320. As seen in the non-limiting example embodiment shown in FIG. 9, the domain name module(s) 3 may be configured to generate one or more recommended domain names including the one or more TLDs, SLDs, nth level domains and/or sub domains associated with the location 315 and/or preferred language 320. These generated domain names may then be transmitted to the client(s) 220 for display on a user interface and/or control panel.

In embodiments that determine the location 315 and/or preferred language 320 based upon a URL 350 used to send a request to the server(s) 210 from a browser 345 running on the client(s) 220, the domain name module(s) 325 may be configured to identify a substring within the URL representing, as non-limiting examples, a location 315 of the client(s) 220 and/or a preferred language 320 for the operator of the browser 345.

As a non-limiting example, the domain name module(s) 325 may be accessible via a web page on a registrar website. To access the user interface/control panel for the domain name module(s) 325, a user may enter the URL http://it.domaincontrolpanel.nyc into the appropriate address bar in a web browser 345. For purposes of this non-limiting example, the sub domain "it" may indicate that the preferred language for the user that accessed the website is Italian. The customized TLD ".nyc" may indicate that the location of the user is New York City, N.Y. Such a customized URL may be used, among other things, to customize a website content to a specific client location 315 and/or to a primary language 320 of the website/domain name module 325 user.

The domain name module(s) 325 may be configured to receive the request to resolve the web page, and further analyze the received request URL 350 to determine and identify one or more sub strings within the URL 350 representing a client location 315 for which a website content should be customized and/or a primary language 320 for which the website content should be customized. As non-limiting examples, the sub string may comprise a sub domain, TLD and/or a website path representing sub folders within the website (e.g., /it/ or /nyc/). In this non-limiting example, the domain name module(s) 325 may further be extrapolate additional information from the URL. For example, the domain name module(s) 325 may be configured to determine, based on the user's preferred language 320 being Italian, and the location 315 of the client(s) 220 being New York City, that the user is accessing the web page from Little Italy in New York City.

If the server(s) 210 determine that the URL comprises one or more substrings representing a client location 315 and/or a primary/preferred language 320 for which the website content should be customized, the domain name module(s) 325 may be configured to identify one or more TLD's associated, within TLD data records 335, with the client location 315 and/or primary/preferred language 320. As seen in the non-limiting example embodiment shown in FIG. 11, the domain name module(s) 325 may be configured to generate one or more recommended domain names including the one or more TLDs, SLDs, nth level domains and/or sub domains associated with the client location 315 and/or primary/preferred language 320. These generated domain names may then be transmitted to the client(s) 220 for display on a user interface and/or control panel.

In embodiments that determine the location 315 and/or preferred language 320 based upon an IP address of the client computer, the domain name module(s) 325 may be configured to identify the IP address of the client(s) 220 on the network. The domain name module(s) 325 may be configured to map the IP address to a real-world geographic location 315 by requesting, from a library mapping at least one IP address to at least one geo location, the location 315 of the client computer 220 based upon the IP address.

This may be accomplished using one or more available geo location databases (e.g., Ip2location, MaxMind, Tamo Soft, IPligence). Such geo location databases may get their contact, IP and/or registration information from WHOIS databases, which may be accurate down to zip code level. When an organization requires a block of IP addresses, a request may be submitted and allocated IP addresses may be assigned to a requested ISP. The server(s) 210 may then use this information to determine the location 315 and/or an associated language 320 of the IP address (i.e., the preferred language may be extrapolated from the location 315 determined by the IP address).

The domain name module(s) 325 may be configured to identify one or more TLD's associated, within TLD data records 335, with the client location 315 and/or preferred language 320. As seen in the non-limiting example embodiment shown in FIG. 13, the domain name module(s) 325 may be configured to generate one or more recommended domain names including the one or more TLDs, SLDs, nth level domains and/or sub domains associated with the location 315 and/or preferred language 320. These generated domain names may then be transmitted to the client(s) 220 for display on a user interface and/or control panel.

In some embodiments of the present system, the user may enter a text string that is written in a first language, but wish to be presented with candidate domain names that are in a second language. For example, a user with a successful business in France may wish to enter the English market. But, because English is a second language, the user may not be comfortable searching for domain names in English using English terminology.

Figure 14:
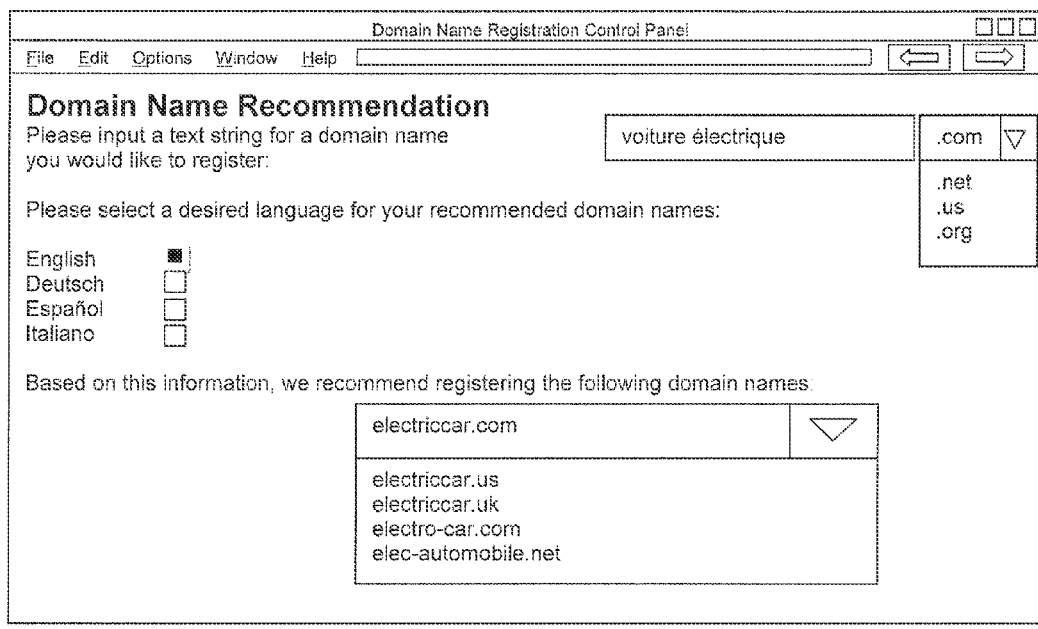
FIG. 14 is an example interface illustrating a possible embodiment of a system and method for recommending top level, second level, nth level and/or sub domains where a user has entered search terms in a first language.

In that case, the domain name module(s) 325 may enable the user to enter a domain name search string or query in a first language, but then select a different language in which the candidate domain names should be generated and presented. With reference to FIG. 14, therefore, an example is presented in which the user has entered a first domain name search in the French language. The search is for "voiture électrique", which means "electric car". The user has then executed the search, but requested that the candidate domain names be presented in English. As illustrated, therefore, the listing of candidate domain names based upon the user's search criteria are all presented in English.

To perform such a search, the domain name module(s) 325 (e.g., executed by server(s) 210) may be configured to first identify the language of the text string entered by the user. There are a number of known libraries that can be used to identify the language of a particular text string, such as language detection libraries provided by GOOGLE or MICROSOFT. To use the libraries, a computer program included within the library is executed against the text string. After processing the string, the library will then return a name of a language. The language identified by the library is the language, selected from a number of candidates, having the highest probability of being the language in which the text string is written. Alternatively, the language of the text string may be inferred by the preferred language 320 of the user, as described herein. If the user's preferred language 320, for example, is French, the domain name module(s) 325 may determine that the text string was entered in French.

Having identified the language of the text string, the domain name module(s) 325 can then identify keywords in the text string and translate those keywords into the selected desired language. Once translated, the domain name spinning process, as described herein, can proceed to generate a number of candidate domain names in the desired language as specified by the user using the translated keywords.

In addition to translating the keywords in the text string into the desired language, the domain name module(s) 325 may be further configured to generate candidate domain names that include TLDs associated with the desired language. As such, in the example depicted in FIG. 14, because the desired language is English, the candidate domain names include .us and .uk TLDs. Conversely, if the desired language included German, TLDs associated with that language (e.g., .de, .at and/or .ch) would be promoted within the listing of candidate domain names generated by the domain name module(s) 325. To do this, the domain name module(s) 325 may store a database or lookup table that identifies, for a number of possible languages, a listing of associated TLDs. Using the lookup table, the domain name module(s) 325 can then generated candidate domain names for all TLDs associated with the desired language.

In some embodiments, the domain name module(s) 325 may be further configured to generate candidate domain names taking into account the type or category of the user's business (or other entity), as described above. In the case of TLDs, the domain name module(s) 325 may be configured to store a table that identifies, for each potential business category, a preference ranking for potential TLDs. The categories may be quite broad, for example, so that TLDs may be ranked in order of preference for non-profit organizations, for-profit organizations, and personal sites. Alternatively, the categories may be relatively narrow, so that TLDs may be ranked for specific types of businesses such as law firms, restaurants, humane societies, and the like. Table 1, shown below, shows an example mapping of business type to TLD preference ranking.

TABLE 1

| Business Category | 1st TLD | 2nd TLD | 3rd TLD |
| --- | --- | --- | --- |
| Profit Company | .com | .co | .company |
| Non-Profit Company | .org | .net | .com |
| Personal | .com | .co | .net |

As shown in Table 1, a number of high-level business types are defined. Then, for each business type, three different ranked TLDs are presented. For the given organization type, the '1st TLD' is a more preferred TLD than the '2nd TLD' and so on. Although only three ranked TLDs are shown in this example, it should be understood that any number of TLDs may be ranked for each business type.

Table 2, below, shows an alternative TLD preference ranking in which TLDs are ranked for more specific business types. In the table, for each category, five different TLDs are ranked in order of preference. As illustrated, the ranked TLDs may include gTLDs, or any variety of TLDs that are available for registration. In general, any number of TLD preference rankings can be generated for each business category.

TABLE 2

| Business Category | 1st TLD | 2nd TLD | 3rd TLD | 4th TLD | 5th TLD |
| --- | --- | --- | --- | --- | --- |
| Law Firm | .com | .lawyer | .co | .law | .legal |
| Bike Shop | .com | .bike | .it | .fr | .ride |
| Pet Rescue | .org | .com | .rescue | .net | .co.us |

The TLD ranking for each business type may be generated by any suitable mechanism. In some cases, the rankings can be generated for each business type based upon the knowledge of marketing experts that are able to value TLDs for each business type. In another implementation, the rankings can be generated by the service provider by analyzing the domain name registration records of its customers. By analyzing the contents of database 230, for example, and, particularly within user record(s) 305 therein, the service provider can identify the domain name registrations for a large number of users. To the extent those domain name registrations are associated with a specific business or entity and the user records(s) 305 identify a business type, the service provider (e.g., utilizing server(s) 210) can analyze the records to identify the most popular TLDs for domain name registrations for each business type or category. That popularity can then be used to generate a preference listing of TLDs for each business type or category. The preference listings may include only conventional TLDs, or may also include combinations of ccTLDs and gTLDs, as necessary.

Figure 15:
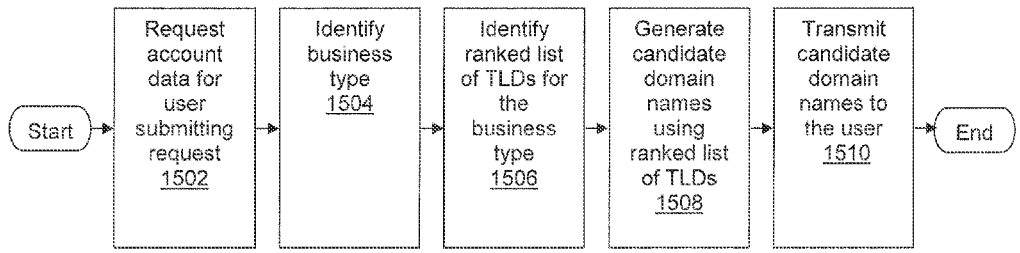
FIG. 15 is a flowchart depicting a method for generating candidate domain names where the candidate domain names include TLDs ranked according to a preference table.

Once the TLD preference table has been generated, the table can be used to boost the prominence of particular TLDs during the candidate domain name spinning or generation process. FIG. 15, for example, shows a method for generating candidate domain names where the candidate domain names include TLDs ranked according to a preference table.

In step 1502 the account data associated with a user submitting a search string is identified. The search string may include a desired domain name or may include a text string containing of a number of separate search terms. The user may be identified using any of the mechanisms described herein. The account data may include one or more user record(s) 305.

Once identified, the account data is retrieved and, in step 1504, the account data is analyzed to identify a business type of a business associated with the user. After the business type is identified, in step 1506 a ranked listing of candidate TLDs is identified for the business type.

After the ranked listing of TLDs is identified, in step 1508, a number of candidate domain names can be generated based upon both the query search string and the ranked order of TLDs for the user's business type. As discussed above, any suitable technique may be used to generate or spin the candidate domain names. These techniques can be similarly used to incorporate weightings allocated to the TLDs based upon the TLD preferences that are, in turn, based upon the user's business type. The weightings for the TLDs in the domain name spinning can be calculated such that the spinning algorithms are biased in favor of TLDs having higher preferences, while TLDs having lower preferences are disfavored by the domain name spinning algorithm.

The use of the TLD preferences in generating candidate domain names makes it more likely that the user will be presented with candidate domain names that include TLDs more relevant to the user's business. For example, if the user's business is a non-profit organization, it would not necessarily be helpful to only suggest '.com' domain names to the user. In some cases, many non-profit organizations do not use a '.com' address as their primary domain name. Accordingly, the present method would ensure that a user with a non-profit business is presented with candidate domain names that are weighted to include '.org' domain names, or some other suitable TLD that is more preferred than the .com TLD.

Similarly, when the TLD preferences include preference listings for relatively precise business types, a user with a business of, for example, a bike shop, will be presented with listings of candidate domain names having TLDs that are preferred for that type of business, while another user with a different type of business would be presented with candidate domain names well suited to that user's business.

Finally, after the candidate domain names have been generated, the listing of candidate domain names can be transmitted to the user in step 1510. The user can then select one of the candidate domain names for registration, or could enter a different search string to see a different set of results. An example user interface is presented in FIG. 16.

Figure 16:
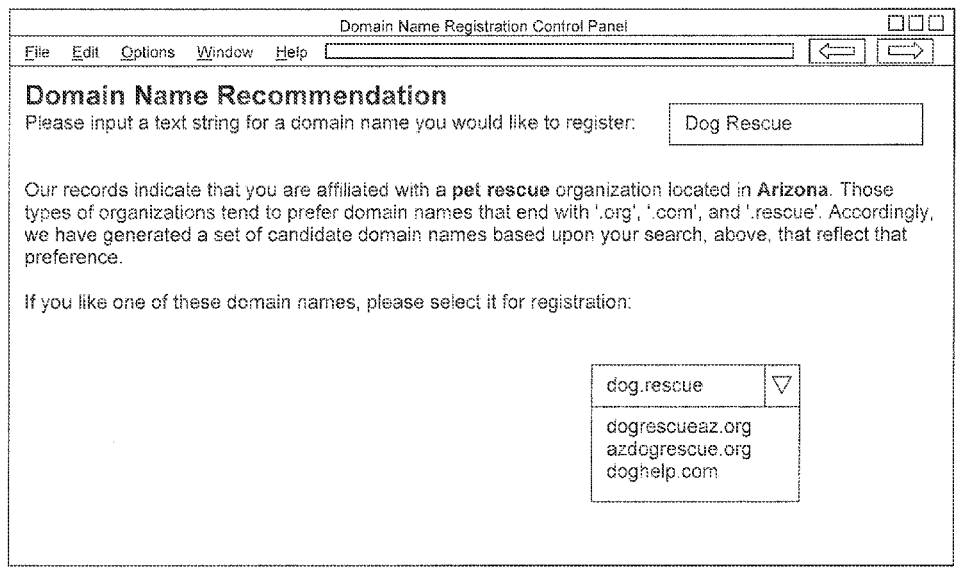
FIG. 16 is an example interface illustrating a possible embodiment of a system and method for recommending top level, second level, nth level and/or sub domains where the candidate domain names are ranked according to a preference table.

As shown in FIG. 16, the user has executed a search for candidate domain names relevant to the string 'Dog Rescue'. After the user submitted the search, the service provider determined that the user is affiliated with a pet rescue organization (this information could be stored within user record(s) 305 of the user, for example). Having identified the type of organization that is affiliated with the user, the service provider is able to identify the TLDs that are preferred for that type of organization. A number of suitable candidate domain names can then be spun and offered for registration by the user.

In some cases, because different businesses may have different TLD preferences in different geographical regions, the TLD preferences can be further broken down by region. Table 3, below, for example, shows a number of TLD preferences for different business types, where the preferences are broken down by geographical region.

TABLE 3

| Business Category - Region | 1st TLD | 2nd TLD | 3rd TLD |
| --- | --- | --- | --- |
| Profit Company - USA | .com | .co | .net |
| Profit Company - United Kingdom | .com | .co.uk | .eu |
| Profit Company - France | .fr | .com | .eu |
| Non-Profit Company - USA | .org | .co | .com |
| Non-Profit Company - United Kingdom | .org.uk | .uk | .net |
| Non-Profit Company - France | .org | .fr | .eu |
| Personal - USA | .com | .us | .net |
| Personal - United Kingdom | .uk | .net | .com |
| Personal - France | .fr | .eu | .net |

The geographic preferences for TLDs can be generated in much the same manner as the TLD preference data contained within Table 1 and Table 2, above. For example, one or more persons, knowledgeable of the relevance of different TLDs in different geographical regions may construct the table by hand. Alternatively, user record(s) 305 for a number of different domain name registrations could be analyzed to determine how frequently different TLDs are used in domain name registrations for businesses of particular types that are located in particular geographic regions. With that data collected, the table could be generated automatically.

Figure 17:
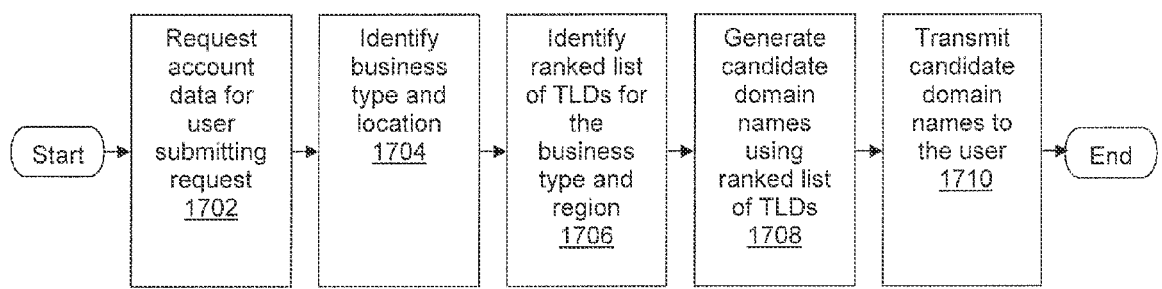
FIG. 17 is a flowchart illustrating a method for generating candidate domain names where the candidate domain names include TLDs ranked according to a preference table that is delineated based upon business type and location.

Having constructed the table, FIG. 17 is a flowchart illustrating a method for generating candidate domain names where the candidate domain names include TLDs ranked according to a preference table that is delineated based upon business type and location.

In step 1702 the account data associated with a user submitting a search string is identified. The search string may include a desired domain name or may include a text string containing of a number of separate search terms. The user may be identified using any of the mechanisms described herein. The account data may include one or more user record(s) 305.

Once identified, the account data is retrieved and, in step 1704, the account data is analyzed to identify a business type of a business associated with the user as well as a location of the business. After the business type and location are identified, in step 1706 a ranked listing of candidate TLDs is identified for the business type and for the location. If the table containing the listing of ranked TLDs does not include a specific entry for a region incorporating the location of the user's business, the table may include a default TLD preference that may be utilized.

After the ranked listing of TLDs is identified, in step 1708, a number of candidate domain names can be generated based upon both the request search string and the ranked order of TLDs for the user's business type and location. As discussed above, any suitable technique may be used to generate or spin the candidate domain names. These techniques can be similarly used to incorporate weighting allocated to the TLDs based upon the TLD preferences based upon the user's business type. The weightings for the TLDs in the domain name spinning can be weighted such that the spinning algorithms are biased in favor of TLDs having higher preferences, while TLDs having lower preferences are disfavored by the domain name spinning algorithm.

The use of the location or region-based TLD preferences in generating candidate domain names makes it more likely that the user will be presented with candidate domain names that include TLDs more relevant to the user's business. For example, if the user's business is a non-profit organization in the United Kingdom, it would not necessarily be helpful to only suggest '.com' domain names to the user. Most non-profit organizations do not use a '.com' address as their primary domain name. Accordingly, the present method could ensure that a user with a non-profit business in the United Kingdom is presented with candidate domain names that are weighted to include '.org.uk' and '.uk' domain names.

Similarly, when the TLD preferences include TLD preference listings for relatively precise business types, a user with a business of, for example, a bike shop located in France, will be presented with listings of candidate domain names having TLDs that are preferred for that type of business in that geographic region, while another user with a different type of business in another location would be presented with candidate domain names well suited to that user's business.

Finally, after the candidate domain names have been generated, the listing of candidate domain names can be transmitted to the user in step 1710. The user can then select one of the candidate domain names for registration, or could enter a different search string to see a different set of results.

In a similar manner to the ranking of TLDs based upon a business category and location, so too can keywords or phrases that appear in SLDs, nth level domain and/or sub domains of the candidate domain names be ranked.

To rank the keywords in the candidate domain names, the service provider may again analyze the existing domain name registration data stored in user record(s) 305 of database 230. The existing domain name registrations will then be grouped by business category and geographic regions based upon data stored in user record(s) 305. The registered domain names can then be parsed to identify individual keywords that appear in SLDs, nth level domains and/or sub domains of the registered domain names. The keywords can then be counted to establish the most popular keywords for different business categories in the different geographical regions.

The result of this analysis could be used to identify domain name keywords that are popular for particular business categories in particular regions. For example, the data may indicate that for a bike shop located in the United States, preferred keywords include "bike" "bicycles" and "USA". Conversely, for a bike shop located in Italy, preferred keywords may include "bici", "bicicletta", and "negozio". Those keywords can then be promoted in the results of any candidate domain name generation process implemented by, for example, the domain name module(s) 325.

In some embodiments, the domain names suggested to the user may be ranked according to the location 315 and/or preferred language 320. The user interface may be configured to receive a selection from the displayed domain names and transmit the selection of the at least one domain name for registration, possibly by the domain name module(s) 325.

In some embodiments, the present system may be configured to receive a query for candidate domain names and then, in response to that query, rather than generate a listing of individual candidate domain names that can individually be registered by the user, recommend or display packages of domain names to be registered. There are a number of reasons for why this can be beneficial. First, in a particular marketplace, consumers may be used to using a variety of different TLDs. In the United Kingdom, for example, businesses may be equally likely to register.com and .uk domain names. If a business were to only register the .com domain name, a competing business could (either intentionally or accidentally) register the same SLD with the .uk TLD. If that were to occur, consumers in the United Kingdom, being equally comfortable with .com and .uk domain names may be confused as to which domain name to use for the business. Accordingly, in this example, a business registering a domain name in the United Kingdom may wish to register a package that includes the desired domain name with both the .com and .uk TLDs.

In some cases, in addition to recommending a package of domain names that is well suited to a particular marketplace, businesses may wish to register packages of domain names for defensive reasons. For example, in a particular market or geographical region, or for particular types of businesses, some TLDs may be popular amongst individual perpetrating fraud, such as individuals implementing phishing scams. In that case, a business may wish to register their SLD with particular TLDs in an effort to prevent that abuse, even if those domain names would be relatively unlikely to be visited by customers.

Figure 18:
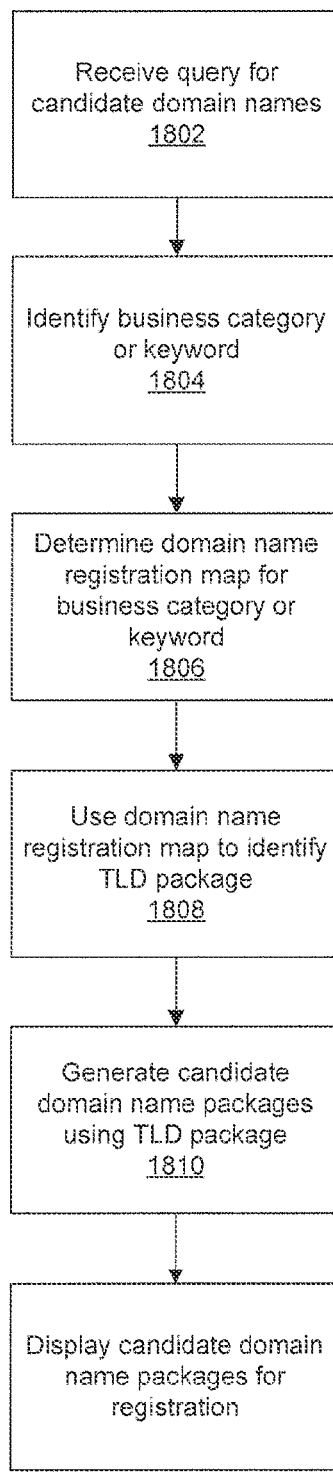
FIG. 18 is a flowchart illustrating a method for recommending a package of domain names for registration based at least in part upon a business category or keyword.

FIG. 18 is a flowchart illustrating a method for recommending a package of domain names for registration based at least in part upon a business category or keyword. The method illustrated in FIG. 18 may be performed, for example, by the service provider of the present disclosure.

In step 1802, a query for a set of candidate domain names is received from a user. As described above, the query may include a domain name itself, or a number of keywords that may be used to identify a number of candidate domain names related to the keywords. The query may be received by one or more server 210 operated by a service provider via an electronic communications network, such as network 200. The query may be entered by a user into a client 220 computer using any suitable interface arranged to receive such a query and cause the transmission of the query to the service provider.

Having received the query in step 1802, in step 1804 the query is processed by the server(s) 210 to identify a business category or keywords. This may involve, as described above, analyzing one or more records in the user's account information to identify a category of a business associated with the user. The business may be one owned or operated by the user, or one by which the user is employed. The category may define a general category for the business (e.g., non-profit, profit, governmental, etc.), or be a more specific category for the business (e.g., bike shop, law firm, bakery, and the like). In other cases, the server(s) 210 may analyze the content of one or more other websites associated with the user to identify keywords therein that may be utilized to identify a particular business category.

This step may involve, in addition to identifying a category for the user's business, also identifying a location or region associated with the business. For example, the location may be identified by a mailing address of the business' headquarters, GPS coordinates, city, or any other location information, all of which may be stored in the user's account information, as described above.

Alternatively, in step 1804 the service provider may instead identify a number of keywords that appear in the query. If the query was originally provided by the user in the form of keywords (e.g., the query was "pizza restaurant arizona"), then no processing is required and those keywords may be utilized. If, however, the query included a domain name, the service provider may utilize any suitable method to identify keywords that may appear within the domain name. Additionally, once identified, the service provider may rank the keywords so as to identify the most prominent keywords within the query.

In some embodiments, the identification of keywords in the query only occurs if a suitable category for a business associated with the user cannot be identified. In other embodiments, though, the service provider may be configured to always identify the keywords in the user's query and to not identify a business category.

After identifying either the business category or keywords in step 1804, a domain name registration map is determined for either the business category or the keywords in step 1806, and, optionally a location.

In the present disclosure a domain name registration map is a representation, for a particular business category or set of keywords, of the number of existing domain name registrations broken down by TLD. The domain name registration map can be generated using any suitable analysis approach for existing domain name registrations. In one embodiment, data stored within public databases such as the DNS and/or the SRS can be analyzed to generate the domain name registration map. Alternatively, one or more user records maintained by the service provider could be used to generate the domain name registration map.

The domain name registration maps utilized in the present system may represent data accumulated world-wide or may be restricted to a particular geographical region. For example, a domain name map could be created to show the popularity of different TLDs in the domain names of restaurants across the world. Or, conversely, a domain name map could be created to show the popularity of different TLDs in the domain names of restaurants located within a particular geographical region, such as the United States or Italy.

Figure 19A:
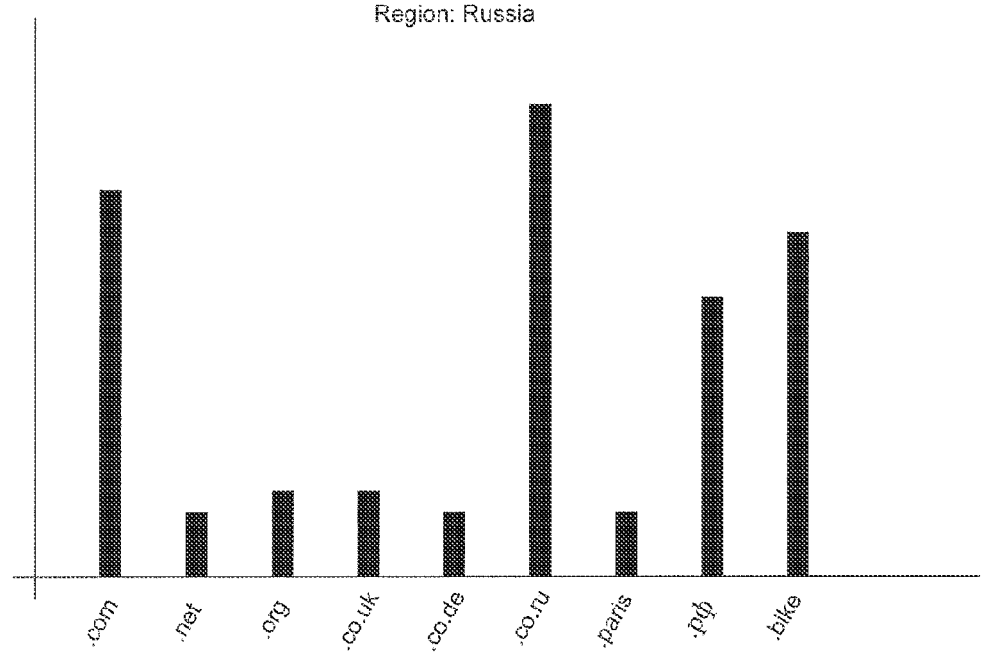
FIGS. 19A and 19B are graphs illustrating example domain name registration maps.

FIG. 19A, for example, illustrates a domain name registration map for a particular business category and a particular region. In this example, the business category is for restaurants and the region is Russia. On the horizontal axis, the domain name registration map lists a number of different TLDs. The vertical axis of the domain name registration map represents the relative popularity of each TLD. The vertical axis may be in the units of the total number of registrations or a percentage of the total number of registrations.

The domain name registration map of FIG. 19A may be generated using any suitable method. In one embodiment, a large number of websites available via the Internet may be categorized based upon keywords that appear in their content. This may be performed, for example, by spidering the Internet to collect content from a large number of websites. That content can then be analyzed to determine whether particular keywords appear in the content enabling the websites to be associated with a particular business category and to identify a location for the website (this may be determined, for example, by identifying a mailing address or office address that appears on the website or analyzing the IP address of the server hosting the website). Once the websites have been categorized and associated with a particular location, DNS entries for the websites that have been placed into the category of interest and that fall within the desired geographical region can be analyzed to identify all the domain name registrations that point to those websites. The domain name registrations can then be summed up to identify the number of registrations in each TLD enabling the domain name map to be created.

In some embodiments, the domain name map may be generated using user record data accessible to the service provider. This may be more efficient than relying on public data sources because the service provider's user records may already store a business category for each website as well as a location.

In creating the domain name registration map, it is not necessary that every website that is available via the Internet and that meets the category and location criteria be analyzed. Instead, it may only be necessary that the domain name registration information for a representative sample set of websites meeting the category and location criteria be analyzed.

Figure 19B:
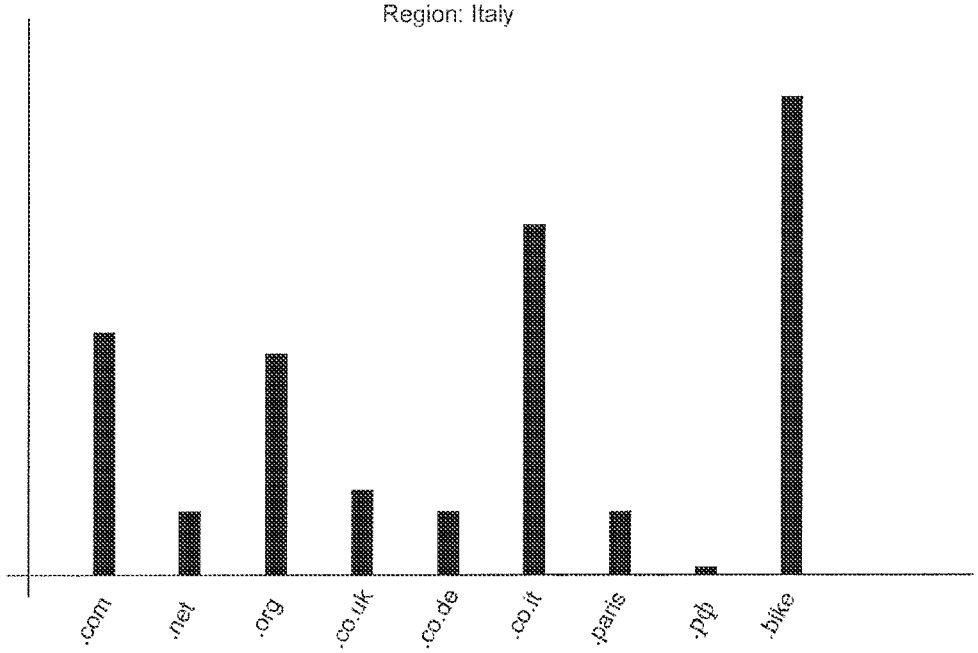

FIG. 19B illustrates a second domain name registration map for a particular set of keywords and a particular region. In this case, the keywords are the Italian words for bike and shop: "bicicletta" and "negozio" and the region is Italy. On the horizontal axis, the domain name registration map lists a number of different TLDs. The vertical axis of the domain name registration map represents the relatively popularity of each TLD. The vertical axis may be in the units of the total number of registrations or a percentage of the total number of registrations.

The domain name registration map of FIG. 19B may be generated using any suitable method. In one embodiment, a large number of website may be analyzed in order to determine a location for the websites. This may be performed, for example, by spidering the Internet to collect content from a large number of websites. That content can then be analyzed to associate each website with a particular location. Once locations have been established for the websites, DNS entries for the websites that fall within the desired geographical region can be analyzed to identify all the domain name registrations that point to those websites. The domain name registrations can then be summed up to identify the number of registrations in each TLD enabling the domain name map to be created.

In some embodiments, the domain name map may be generated using user record data accessible to the service provider. This may be more efficient than relying on public data sources as the service provider's user records may already store a location data for each user record.

In creating the domain name registration map, it is not necessary that every website that is available via the Internet and that meets the category and location criteria be analyzed. Instead, it may only be necessary that the domain name registration information for a representative sample set of websites meeting the category and location criteria be analyzed.

Returning to FIG. 18, once the domain name registration map has been determined for either the business category or key words (and, optionally, location), in step 1808 a TLD package is created using the domain name registration map. The TLD package includes a listing of TLDs from the domain name registration map that are most frequently registered for a given business category or domain name keywords (and, optionally, for a particular geographical region). The TLD package can be generated, for example, by selecting the N most popular TLDs for the domain name registration map, where N is an integer. The value of N can be selected in any suitable manner. In some embodiments, N is fixed to a value (e.g., '5') so that the TLD package will always include the 5 most popular TLDs. In some cases, the value of N depends on one or more variables. For example, N may have different values for different business categories, keywords, or locations. For example, when the location is in Europe where many businesses have customers in a relatively large number of countries, the value of N may be higher than in North America, where a business' customers tend to be in a much smaller number of countries. In other embodiments, the TLDs listed in the TLD package may be those in the domain name registration map that exceed a particular percentage of the total number of registrations. Referring again to FIG. 19A, an example TLD package based on the domain name registration map may include the TLDs .com, .co.ru, .bike., and .рф.

In some embodiments, the TLD package may be expanded to include TLDs that may be a potential source of phishing or scam communications. By including such TLDs in the TLD package, the user may be given an opportunity to preemptively register domain names that may otherwise be used to target the user's customers. For example, certain TLDs may be identified as popular sources of scam communications, such as phishing attempts. In that case, those TLDs may be added to the TLD package to provide the user any opportunity to defensively register domains that may otherwise be registered by fraudsters.

Referring to FIG. 18, once the TLD package is determined, a number of candidate domain name packages are generated in step 1810. Each candidate domain name package includes a collection of domain names that are 1) available for registration, and 2) includes domain names with each TLD in the TLD package. Any suitable method may be used to generate the candidate domain name packages.

Figure 20:
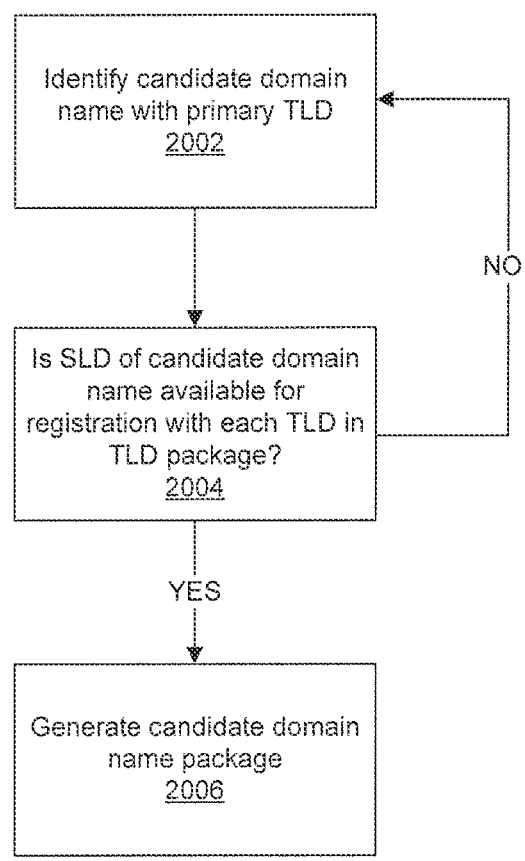
FIG. 20 is a flowchart depicting a method for generating a candidate domain name package.

For example, FIG. 20 is a flowchart depicting a method for generating a candidate domain name package. In step 2002, a candidate domain name is generated for a primary TLD in the TLD package. The primary TLD may be the most popular TLD in the TLD package (the popularity may be determined based upon the relevant domain name map). Once the primary TLD package is generated, a candidate domain name can be generated for the primary TLD using the user's original query (see, for example, the query received in step 1802 of FIG. 18). Any suitable domain name spinning technique may be utilized to generate the candidate domain name for the primary TLD using the query data and, optionally, any other information available to the service provider.

Once the first candidate domain name has been generated for the primary TLD, in step 2004 it is determined whether the SLD of the first candidate domain name is available for registration for all the other TLDs in the TLD package. If so, a candidate domain name package is generated including the first candidate domain name (in the primary TLD) as well as the candidate domain names made up of the SLD of the primary domain name and the other TLDs in the TLD package in step 2006. For example, if a user performed a query for candidate domain names using the query "pizza restaurant phoenix" and with a TLD package that includes the TLDs .com, .us. and .az, where .com is the most popular TLD, the system may identify a first candidate domain name for the .com TLD. For example, the first candidate domain name may be 'phoenix-pizza.com'. The system would then check to see whether the SLD 'phoenix-pizza' is available with .us and .az TLDs. If so, then the system may generate a candidate domain name package that includes 'phoenix-pizza.com', ' phoenix-pizza.us', and 'phoenix-pizza.az'.

Once the candidate domain name package has been created, the package can be offered to the user for registration of all domain names in the candidate domain name package.

If, however, in step 2004 it is determined that the SLD of the first candidate domain name is not available for registration for all the other TLDs in the TLD package, the method returns to step 2002 and a new candidate domain name is generated for the primary TLD. Once the new candidate domain name is generated the method moves to step 2004 and the SLD of the new candidate domain name is check for availability in the other TLDs of the TLD package.

As described above, step 2004 involves checking the SLD of the candidate domain name with the primary TLD for availability in the remaining TLDs of the TLD package. In various embodiments, the SLD may be translated before being checked for availability in the various TLDs. Where a particular TLD is associated with a specific language, for example, the SLD may be translated into that language before being checked for availability in that TLD. For example, if a user performed a query for candidate domain names using the query "bike shop phoenix" and with a TLD package that includes the TLDs .com, .us. and .it, where .com is the most popular TLD, the system may identify a first candidate domain name for the .com TLD. For example, the first candidate domain name may be 'phoenix-bike.com'. The system would then check to see whether the SLD 'phoenix-bike' is available with the .us TLD. When checking the .it TLD, however, the SLD may be translated so that the system checks whether the SLD 'phoenix-bicicletta' is available with the .it TLD. If so, then the system may generate a candidate domain name package that includes 'phoenix-bike.com', ' phoenix-bike.us', and 'phoenix-bicicletta.it'.

In another embodiment, the two approaches described above may be combined so that a candidate domain name package would include a first set of candidate domain names for each TLD in the TLD package with the same SLD and then additional candidate domain names for TLDs that are associated with different languages.

In another implementation, a candidate domain name package may be generated by identifying a suitable candidate domain name for each TLD in the TLD package without requiring that the SLDs of each candidate domain name be the same or translations of one another.

Figure 21:
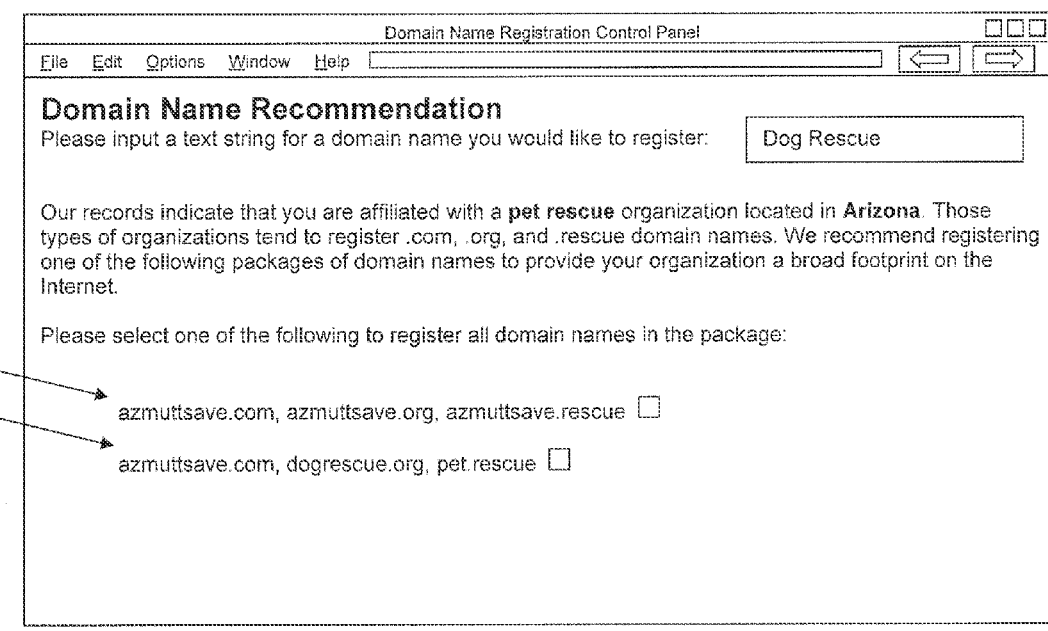
FIG. 21 depicts an example user interface enabling a user to register a candidate domain name package after executing a search.

Once the candidate domain name package has been generated, one or more packages can be offered to the user for registration via a suitable user interface. For example, FIG. 21 depicts an example user interface enabling a user to register a candidate domain name package after executing a search. In the example depicted in FIG. 21, the user is affiliated with a pet rescue organization located in Arizona. The user has performed a domain name search using the search string "dog rescue." The user's business is an organization that falls into the category of 'pet rescue' and is located in Arizona. After determining the candidate domain name map for organizations that fall into that category and are located in the United States (i.e., the region encompassing Arizona), the system has identified a TLD package of .com, .org, and .rescue, with .com being the primary TLD. Using the methods described above, two different candidate domain name packages have been created.

The first package 2102 includes a package of domain names where the SLDs are identical for each TLD in the TLD package. The second package 2104 includes candidate domain names where the best candidate domain name was generated for each TLD independently.

In various embodiments, when a set of candidate domain names have been generated (whether in the form of individual candidate domain names or packages of candidate domain names), the candidate domain names can be filtered before being displayed for registration by a user. The filtering could involve removing potentially offensive or dangerous domain names from the listing of candidate domain names. In some cases, filtering may involve not removing any of the candidate domain names and instead making the user aware of the risk of registering a potentially offensive or dangerous domain name.

Figure 22:
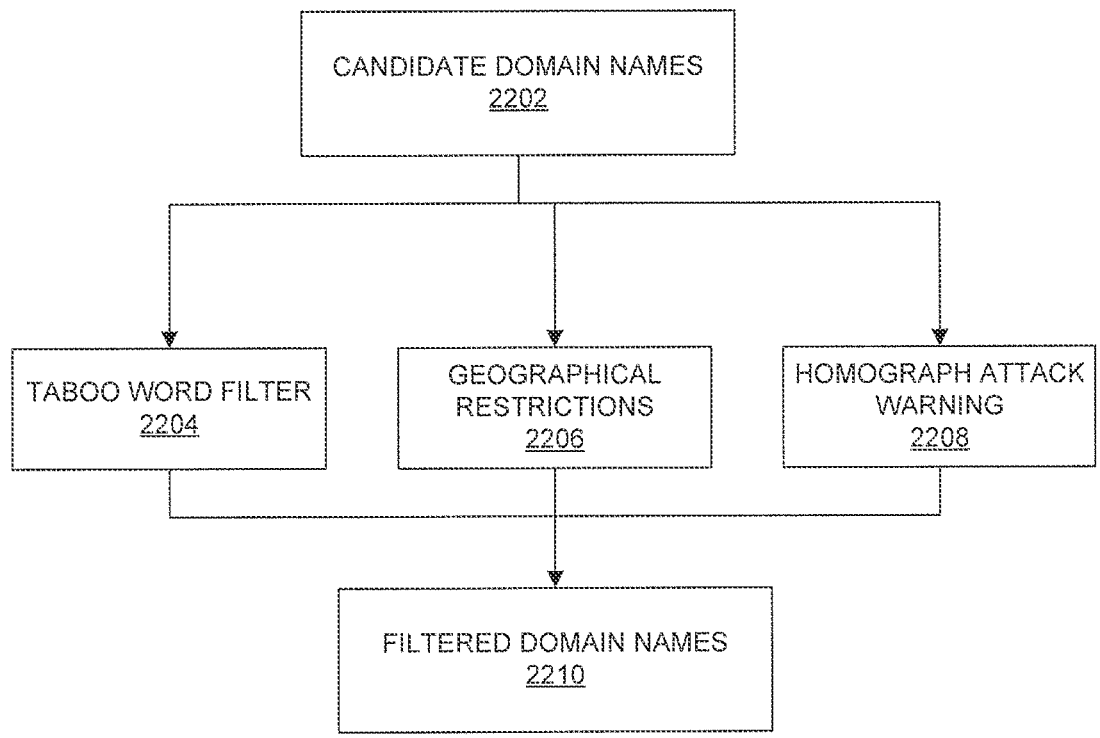
FIG. 22 is a flowchart illustrating an example method for filtering a number of candidate domain names.

FIG. 22 is a flowchart illustrating an example method for filtering a number of candidate domain names. The method may be performed by the service provider of the present disclosure (e.g., utilizing the server(s) 210), for example, as part of a process of generating a listing of candidate domain names for a user. In step 2202 a number of candidate domain names are received. The candidate domain names may be generated, for example, in response to a query received from a user. The query may include a number of keywords and the candidate domain names may be relevant to those keywords.

After the candidate domain names are received, the candidate domain names may be filtered to remove or identify candidate domain names that include taboo words (step 2204). The taboo words may be international so that any candidate domain name that contains a taboo word will be filtered. In some embodiments, however, the taboo words may be regionalized because words that are taboo in one region may not be considered taboo in other geographical regions. Accordingly, a first set of taboo words may be defined for a first geographical region and a second set of taboo words may be defined for a second geographical region. The location of the user will determine which set of taboo words are used to filter the candidate domain names. If the location of the user falls within a region having the first set of taboo words, candidate domain names that contain any of those taboo words may be filtered. Conversely, if the location of the user falls within a region having the second set of taboo words, candidate domain names that contain any of those taboo words may be filtered.

The candidate domain names may also be filtered for geographical restrictions in step 2206. For example, some of the candidate domain names may include gTLDs that are affiliated with a particular place or region (e.g., .nyc or .arizona). Sometimes those gTLDs are only authorized to be registered by users or businesses that actually reside in those regions. In that case, the geographical restrictions of any gTLDs (if present) can be analyzed in view of the user's location to determine whether the geographically-restricted gTLDs should be removed or filtered from the candidate domain name list.

Additionally, in step 2208, the candidate domain names can be analyzed to determine whether they present the risk of being subject to homograph attacks. Those domain names can then be filtered from the candidate domain name list. This may be achieved using a number of different techniques. In one example, domain names may be disallowed and filtered if they include mixed scripts (e.g. combination of Cyrillic and Latin).

At the completion of steps 2204, 2206, and 2208, a filtered set of candidate domain names is generated in step 2210 and can be presented to the user for selection and registration.

Any steps included in the embodiments illustrated in the Figures are not limited to their respective illustrated embodiments, and may be combined in several different orders and modified within multiple other disclosed embodiments. Likewise, the method steps disclosed herein may be accomplished by a software module executed on a server and/or client configured to accomplish that method step.

Other embodiments and uses of the above inventions will be apparent to those having ordinary skill in the art upon consideration of the specification and practice of the inventions disclosed herein. The specification and examples given should be considered exemplary only, and it is contemplated that the appended claims will cover any other such embodiments or modifications as fall within the true scope of the inventions.

The Abstract accompanying this specification is provided to enable the United States Patent and Trademark Office and the public generally to determine quickly from a cursory inspection the nature and gist of the technical disclosure and in no way intended for defining, determining, or limiting the present inventions or any of its embodiments.

The inventions claimed are:

1. A method, comprising:
   receiving by a domain name registrar via a communications network a query including at least one keyword, the query being submitted by a user via a client device;
   identifying by the domain name registrar a business category associated with the user;
   identifying by the domain name registrar a plurality of location identifiers associated with the user, wherein the plurality of location identifiers comprises an address of the user, an address of a business of the user, a phone number of the user and a telecommunications service provider of the user;

accessing by the domain name registrar a data base storing a plurality of top level domain name rankings to identify a first ranking of top level domain names for the business category, wherein the first ranking of top level domain names are at least partially determined by the plurality of location identifiers and wherein the first ranking of top level domain names for the business category includes a most popular top level domain in a plurality of domain name registrations by a plurality of businesses belonging to the business category;

generating by the domain name registrar a package of candidate domain names relevant to the query, the package of candidate domain names including a candidate domain name for each top level domain name in the first ranking of top level domain names;

displaying by the domain name registrar the package of candidate domain names relevant to the query for selection and registration by the user;

receiving by the domain name registrar, in response to displaying the package of candidate domain names, a request from the user to register the package of candidate domain names; and registering by the domain name registrar each domain name in the package of candidate domain names to the user.

2. The method of claim 1, wherein generating the package of candidate domain names includes for one of the top level domain names in the first ranking of top level domain names translating the at least one keyword in a language associated with the one of the top level domain names.

3. The method of claim 1, including:
identifying one or more restricted words associated with a region containing a location identified by the location identifier; and
displaying an alert to the user when one or more of the candidate domain names includes the one or more restricted words.

4. The method of claim 1, wherein the query includes a request for a web page and identifying, by the one or more computer servers, one or more keywords in the query includes parsing a uniform resource locator of the web page.

5. A system, comprising:
a domain name registrar, comprising processors, communicatively coupled to a communications network and the processors are configured to perform the steps of:
receiving by the domain name registrar via a communications network, a query including at least one keyword, the query being submitted by a user via a client device;
identifying by the domain name registrar a business category associated with the user;
identifying by the domain name registrar a plurality of location identifiers associated with the user, wherein the plurality of location identifiers comprises an address of the user, an address of a business of the user, a phone number of the user and a telecommunications service provider of the user;
accessing by the domain name registrar a data base storing a plurality of top level domain name rankings to identify a first ranking of top level domain names for the business category, wherein the first ranking of top level domain names are at least partially determined by the plurality of location identifiers and wherein the first ranking of top level domain names for the business category includes a most popular top level domain in a plurality of domain name registrations by a plurality of businesses belonging to the business category;
generating by the domain name registrar a package of candidate domain names relevant to the query, the package of candidate domain names including a candidate domain name for each top level domain name in the first ranking of top level domain names;
displaying by the domain name registrar the package of candidate domain names relevant to the query for selection and registration by the user;
receiving by the domain name registrar, in response to displaying the package of candidate domain names, a request from the user to register the package of candidate domain names; and registering by the domain name registrar each domain name in the package of candidate domain names to the user.

* * * * *